United States Patent
Zhang

(10) Patent No.: US 11,626,904 B2
(45) Date of Patent: *Apr. 11, 2023

(54) METHOD AND DEVICE FOR MULTI-ANTENNA TRANSMISSION IN USER EQUIPMENT (UE) AND BASE STATION

(71) Applicant: APEX BEAM TECHNOLOGIES LLC, Marshall, TX (US)

(72) Inventor: Xiaobo Zhang, Shanghai (CN)

(73) Assignee: APEX BEAM TECHNOLOGIES LLC, Marshall, TX (US)

(*) Notice: Subject to any disclaimer, the term of this patent is extended or adjusted under 35 U.S.C. 154(b) by 71 days.

This patent is subject to a terminal disclaimer.

(21) Appl. No.: 17/138,945

(22) Filed: Dec. 31, 2020

(65) Prior Publication Data

US 2021/0126676 A1   Apr. 29, 2021

Related U.S. Application Data

(63) Continuation of application No. 16/454,075, filed on Jun. 27, 2019, now Pat. No. 10,951,271, which is a
(Continued)

(30) Foreign Application Priority Data

Dec. 28, 2016 (CN) .......................... 201611236923.2

(51) Int. Cl.
*H04L 7/04* (2006.01)
*H04B 7/0408* (2017.01)
(Continued)

(52) U.S. Cl.
CPC ......... *H04B 7/0408* (2013.01); *H04B 7/0413* (2013.01); *H04B 7/0617* (2013.01); *H04W 72/085* (2013.01)

(58) Field of Classification Search
CPC ........ H04B 1/0064; H04B 7/024; H04B 7/04; H04B 7/0404; H04B 7/0408;
(Continued)

(56) References Cited

U.S. PATENT DOCUMENTS

2015/0341093 A1* 11/2015 Ji .............................. H04J 11/00
375/267
2016/0143055 A1   5/2016 Nammi et al.
(Continued)

FOREIGN PATENT DOCUMENTS

CN   102170335 A   8/2011
CN   103918195 A   7/2014
(Continued)

OTHER PUBLICATIONS

ISR received in application No. PCT/CN2017/094209 dated Oct. 23, 2017.
(Continued)

*Primary Examiner* — Frank Duong
(74) *Attorney, Agent, or Firm* — Zhong Law, LLC

(57) ABSTRACT

A method and a device for multi-antenna transmission in a user equipment and a base station are disclosed in the present disclosure. The user equipment first receives a first signaling, receives a first wireless signal, and transmits first information. K antenna port groups are used to transmit the first wireless signal. The first signaling is used to determine the K antenna port groups. The K antenna port groups respectively correspond to K channel quality values. K1 antenna port groups of the K antenna port groups correspond to K1 channel quality values of the K channel quality values. The K1 is a positive integer less than or equal to the K. A first proportional sequence corresponds to a ratio(ratios)
(Continued)

among the K1 channel quality values. The first information is used to determine the K1 antenna port groups and the first proportional sequence.

20 Claims, 10 Drawing Sheets

Related U.S. Application Data continuation of application No. PCT/CN2017/094209, filed on Jul. 25, 2017.

(51) Int. Cl.
*H04B 7/0413* (2017.01)
*H04B 7/06* (2006.01)
*H04W 72/08* (2009.01)

(58) Field of Classification Search
CPC .. H04B 7/0413; H04B 7/0452; H04B 7/0456; H04B 7/0491; H04B 7/0495; H04B 7/06; H04B 7/0617; H04B 7/0632; H04B 7/0695; H04B 7/086; H04L 5/0023; H04L 5/0048; H04L 5/0053; H04W 52/40; H04W 72/085
See application file for complete search history.

(56) References Cited

U.S. PATENT DOCUMENTS

| | | | | |
|---|---|---|---|---|
| 2016/0182137 | A1* | 6/2016 | Onggosanusi | H04B 7/0469 370/329 |
| 2017/0070277 | A1* | 3/2017 | Si | H04W 72/0413 |
| 2017/0085303 | A1 | 3/2017 | Chen et al. | |
| 2017/0237478 | A1* | 8/2017 | Kwak | H04B 7/0639 370/329 |
| 2017/0288743 | A1* | 10/2017 | Nam | H04L 5/0053 |

FOREIGN PATENT DOCUMENTS

| | | |
|---|---|---|
| CN | 104170272 A | 11/2014 |
| CN | 104202073 A | 12/2014 |
| CN | 104885499 A | 9/2015 |
| CN | 105474556 A | 4/2016 |
| CN | 105580468 A | 5/2016 |
| CN | 106034360 A | 10/2016 |
| CN | 106209195 A | 12/2016 |
| CN | 106211338 A | 12/2016 |
| WO | 2014201638 A | 12/2014 |
| WO | 2016047505 A1 | 3/2016 |

OTHER PUBLICATIONS

CN201910037365.4 Notification to Grant Patent Right for Invention dated May 19, 2020.
CN201910037365.4 1st Office Action dated Mar. 17, 2020.
CN201910037365.4 second Office Action dated Apr. 14, 2020.
CN201611236923.2 Notification to Grant Patent Right for Invention dated Jan. 14, 2019.
CN201611236923.2 1st Office Action dated Dec. 10, 2018.
CN201611236923.2 First Search Report dated Nov. 30, 2018.
3GPPTSG RAN WG1#87, "On Procedures for Beam Selection and Feedback Signalling," Nokia, Alcatel-Lucent Shanghai Bell, 2016, pp. 1-19.
3GPPTSG RAN WG1#86, "Overview on Beam Management," R1-1609080 Samsung, 2016, pp. 1-12.
3GPPTSG RAN1 86b, "Beam Management for NR," R1-1610145 Qualcomm, Oct. 2016, pp. 1-12.
3GPPTSG RAN WG1#87, "QCL Assumptions Across Antenna Ports of a Same RS Type," R1-1612493 Sumsung, 2016, pp. 1-8.
3GPPTSG RAN1 86b, "Beam Management for NR," Qualcomm, R1-1612056 Nov. 2016, pp. 1-11.
3GPPTSG RAN WG1#86, "On Beam Management in NR—Procedures," R1-1610239 Nokia, Alcatel-Lucent Shanghai Bell, 2016, pp. 1-4.
3GPPTS 36.331, "3rd Generation Partnership Project; Technical Specification Group Radio Access Network; Evolved Universal Terrestrial Radio Access (E-UTRA); Radio Resource Control (RRC); Protocol specification," Advanced LTE Pro, 2016, pp. 627.

* cited by examiner

METHOD AND DEVICE FOR MULTI-ANTENNA TRANSMISSION IN USER EQUIPMENT (UE) AND BASE STATION

CROSS-REFERENCE TO RELATED APPLICATION

This application is a continuation of U.S. application Ser. No. 16/454,075, filed Jun. 27, 2019, which is a continuation of International Application No. PCT/CN2017/094209, filed Jul. 25, 2017, claiming the priority benefit of Chinese Patent Application Serial Number 201611236923.2, filed on Dec. 28, 2016, the full disclosure of which is incorporated herein by reference.

BACKGROUND

Technical Field

The present disclosure relates to a scheme for multi-antenna transmission in a wireless communication system.

Related Art

Massive Multiple-Input Multiple-Output (MIMO) has become a research hotspot for next-generation mobile communications. In massive MIMO, multiple antennas can improve communication quality by forming narrower beams pointing in a specific direction through beamforming. Massive MIMO can also form different directions through multiple antennas for serving multiple users to improve the throughput of massive MIMO systems and reduce transmission delay.

According to the discussion of 3rd Generation Partner Project (3GPP) Radio Access Network 1 (RAN1), a hybrid beamforming in combination of analog beamforming and digital precoding has become an important research topic for New Radio Technology (NR) systems.

SUMMARY

Through research, the inventors found that in a massive MIMO system, the base station can perform beam scanning over a period of time resources. The UE selects and reports the beam. However, due to the limitation of air interface resources, the number of beams used for beam scanning and the number of beams reported by the UE are limited. In addition, due to the uncertainty of the UE location, the beam used for beam scanning does not necessarily include the beam that best serves the UE. How to use the information reported by the UE to form the best beam to serve the UE service is an urgent problem to be solved.

In view of the above problem, the present disclosure provides a solution. It should be noted that, in the case of no conflict, the embodiments in the user equipment (UE) and the features in the embodiments of the present disclosure can be applied to the base station, and vice versa. Further, in case of no conflicts, the embodiments of the present disclosure and the features of the embodiments may be arbitrarily combined with each other.

The present disclosure provides a method for multi-antenna transmission in a user equipment (UE), including:
receiving a first signaling;
receiving a first wireless signal; and
transmitting first information;
wherein, K antenna port groups are used to transmit the first wireless signal; the first signaling is used to determine the K antenna port groups; the K is a positive integer greater than 1; the K antenna port groups respectively correspond to K channel quality values; the K channel quality values are K non-negative real numbers; K1 antenna port groups of the K antenna port groups correspond to K1 channel quality values of the K channel quality values; the K1 is a positive integer less than or equal to the K; a first proportional sequence corresponds to a ratio(ratios) among the K1 channel quality values; the first information is used to determine {the K1 antenna port groups, the first proportional sequence}; the first signaling is used to determine a target threshold; the target threshold is a non-negative real number; a first channel quality is a best channel quality value among the K1 channel quality values; a second channel quality is a worse channel quality value among the K1 channel quality values; a ratio between the second channel quality and the first channel quality is greater than or equal to the target threshold.

In the embodiment, the advantage of the foregoing method is that the base station may obtain a proportional relationship among reception qualities corresponding to multiple beams, and may generate a more accurate serving beam for the UE according to the proportional relationship, thereby improving transmission quality.

In one embodiment, the beams and the serving beam are analog beams.

In one embodiment, the antenna port is formed by superimposing multiple physical antennas through antenna virtualization. A mapping coefficient of the antenna port to the plurality of physical antennas constitutes a beamforming vector for the antenna virtualization to form a beam.

In one embodiment, the antenna virtualization includes analog beamforming and digital beamforming. The analog beamforming is a mapping of an RF link output to the plurality of physical antennas and is used to form an analog beam. The digital beamforming is a mapping of the antenna port to the RF link and is used to form a digital beam.

In one embodiment, the beamforming vector is a product of an analog beamforming matrix and a digital beamforming vector. The analog beamforming matrix is composed of one or more analog beamforming vectors.

In one embodiment, the beamforming vector is a Kronecker product of an analog beamforming vector and a digital beamforming vector.

In one embodiment, the antenna virtualization only includes analog beamforming.

In one embodiment, the antenna port group is composed of one antenna port.

In one embodiment, the antenna port group is composed of a plurality of antenna ports.

In one embodiment, the same analog beamforming vectors and different digital beamforming vectors are used for antenna virtualization of different antenna ports within the antenna port group.

In one embodiment, the K antenna port groups include two antenna port groups, and the numbers of the antenna ports included in the two antenna port groups are different.

In one embodiment, the antenna port corresponds to a reference signal. The reference signal is transmitted through the antenna port.

In one embodiment, the reference signal is a reference symbol.

In one embodiment, the reference signal includes a plurality of reference symbols. One reference symbol occupies one Resource Element (RE).

In one embodiment, the reference signal is a Synchronization Signal (SS).

In one embodiment, the reference signal is a Primary Synchronization Signal (PSS).

In one embodiment, the reference signal is a Secondary Synchronization Signal (SSS).

In one embodiment, the reference signal is a Channel State Information Reference Signal (CSI-RS).

In one embodiment, the reference signal is a Demodulation Reference Signal (DMRS).

In one embodiment, the reference signal is a DMRS of a Physical Broadcast Channel (PBCH).

In one embodiment, the reference signal is a DMRS of a Physical Downlink Share Channel (PDSCH).

In one embodiment, the first wireless signal is a plurality of multi-carrier symbols.

In one embodiment, the first wireless signal is an SS burst. The SS burst includes a plurality of SS blocks. The SS blocks include at least one synchronization signal.

In one embodiment, the first wireless signal is an CSI-RS burst.

In one embodiment, the first wireless signal is one beam sweep. The beam scanning is an operation of covering a spatial area by a transmitted or received beam in a predetermined manner over a period of time.

In one embodiment, the K antenna port groups respectively correspond to K reference signal groups. The K reference signal groups are respectively transmitted through the K antenna port groups. The first wireless signal is composed of the K reference signal groups.

In one embodiment, K different analog beamforming vectors are used for analog beamforming of the K antenna port groups.

In one embodiment, the time-frequency pattern and the Orthogonal Cover Code (OCC) of at least two reference signals of the K reference signal groups are the same in one time unit. The two reference signals are transmitted on different time resources.

In one embodiment, the time unit is a symbol.

In one embodiment, the time unit is a time slot.

In one embodiment, the time unit is a subframe.

In one embodiment, the time unit is a short Transmission Time Interval (sTTI).

In one embodiment, the first signaling explicitly indicates the K antenna port groups.

In one embodiment, the first signaling implicitly indicates the K antenna port groups.

In one embodiment, the first signaling is higher layer signaling.

In one embodiment, the first signaling is a Radio Resource Control (RRC) signaling.

In one embodiment, the first signaling is a MAC layer signaling.

In one embodiment, the first signaling is a MAC Control Element (MAC CE).

In one embodiment, the first signaling is a physical layer signaling.

In one embodiment, the first signaling is carried by a Physical Downlink Control Channel (PDCCH).

In one embodiment, the first signaling is Downlink Control Information (DCI).

In one embodiment, the first signaling is common to the cell.

In one embodiment, the first signaling is UE-specific.

In one embodiment, the first signaling is UE group specific.

In one embodiment, the channel quality value is one of instantaneous Reference Signal Received Power (RSRP), long-term RSRP, SINR or SNR.

In one embodiment, the K channel quality values are wideband channel quality values.

In one embodiment, the first information explicitly indicates the K1 antenna port groups.

In one embodiment, the first information implicitly indicates the K1 antenna port groups.

In one embodiment, the first information explicitly indicates the first proportional sequence.

In one embodiment, the first information implicitly indicates the first proportional sequence.

In one embodiment, the first information is carried by a Physical Uplink Shared Channel (PUSCH).

In one embodiment, the first information is carried by a Physical Uplink Control Channel (PUCCH).

In one embodiment, the first information is transmitted in a CSI report.

In one embodiment, the first information is transmitted in a plurality of messages.

In one embodiment, a bitmap is used to determine the K1 antenna port groups.

In one embodiment, the K1 antenna port groups correspond to the same receiving beamforming vector.

In one embodiment, the receiving beamforming vector is an analog receiving beamforming vector.

In one embodiment, the K antenna port groups are represented by a bit string of length K, the bit position corresponding to the K1 antenna port groups is 1, and the other bit positions are 0.

In one embodiment, the K1 is greater than 1.

In one embodiment, the K1 is equal to 1.

In one embodiment, the first proportional sequence includes K1-1 positive real number(s). The K1-1 positive real numbers is(are) a ratio(s) between the channel quality values other than the best channel quality value of the K1 channel quality values and the best channel quality value.

In one embodiment, the first proportional sequence is composed of quantized values corresponding to the K1-1 positive real number(s).

In one embodiment, when the K1 is equal to 1, the first proportional sequence is determined to be absent.

In one embodiment, the first proportional sequence is composed of K1 positive real numbers. The K1 positive real numbers are respectively ratios between the K1 channel quality values and the best channel quality value of the K1 channel quality values.

In one embodiment, the first proportional sequence is composed of quantized values corresponding to the K1 positive real numbers.

In one embodiment, the first proportional sequence is composed of K1 positive real numbers less than or equal to 1, and the first proportional sequence includes at least one 1.

In one embodiment, the K1 beamforming vectors and the first proportional sequence respectively corresponding to the K1 antenna port groups are used to generate a service beam for data transmission with the UE.

In one embodiment, the transmitter of the first wireless signal determines a correspondence between a service beam related to a relative position of the UE and a collection of the K1 antenna ports and the first proportional sequence according to the coverage space, and then determines the service beam according to the K1 antenna ports and the first proportional sequence reported by the UE.

In one embodiment, the first antenna port group and the second antenna port group are two antenna port groups of the K1 antenna port groups, and the K1 is equal to 2. A first beamforming vector is used for beamforming of the first antenna port group, and a second beamforming vector is used for beamforming of the second antenna port group. The first proportional sequence is composed of a first element and a second element, wherein the first element corresponds to the first antenna port group, and the second element corresponds to the second antenna port group. The first element is equal to 1, the second element is equal to a, and the a is a positive real number less than 1.

In one embodiment, a transmitter of the first wireless signal uses the first element and the second element to respectively weight the direction corresponding to the first beamforming vector and the direction corresponding to the second beamforming vector so as to obtain a direction corresponding to the service beam.

In one embodiment, a correspondence table is stored in the transmitter of the first wireless signal. The correspondence table is used to determine a correspondence between a serving beam of the UE and a collection of the K1 antenna ports and the first proportional sequence. The transmitter of the first wireless signal retrieves the correspondence table according to the first antenna port group, the second antenna port group and the first proportional sequence to obtain an analog beam direction for communication with the UE.

In one embodiment, the K1 beamforming vectors and the first proportional sequence respectively corresponding to the K1 antenna port groups are used to generate a signal for the next beam scanning. The variables of the generation function of the plurality of beamforming vectors used by the signal are the K1 beamforming vectors and the first proportional sequence.

In one embodiment, a center of the coverage space of the plurality of beamforming vectors is determined by the K1 antenna port groups and the first proportional sequence.

In one embodiment, the K channel quality values are wideband channel quality values.

In one embodiment, the first proportional sequence comprises K1 positive real numbers less than or equal to 1, and the first proportional sequence comprises at least one 1; or the first proportional sequence comprises quantized values corresponding to K1 positive real numbers; or the first proportional sequence includes K1-1 positive real number(s), and the K1-1 positive real numbers is(are) a ratio(ratios) between the channel quality values other than the best channel quality value among the K1 channel quality values and the best channel quality value; or the first proportional sequence comprises a quantized value(s) corresponding to K1-1 positive real number(s).

In one embodiment, K2 antenna port groups in the K antenna port groups correspond to K2 channel quality values in the K channel quality values; the K2 is a positive integer less than or equal to the K; a second proportional sequence corresponds to a ratio among the K2 channel quality values; a first receiving beamforming vector is used to receive signals transmitted through the K1 antenna port groups; a second receiving beamforming vector is used to receive signals transmitted through the K2 antenna port groups; the first receiving beamforming vector and the second receive beamforming vector are different; the first information is further used to determine the K2 antenna port groups and the second proportional sequence.

In the embodiments, the above methods have the advantages that multiple candidate service beams are generated for different receive beamforming vectors through different beamforming vectors and different proportional sequences of different antenna port groups respectively, thereby increasing the transmission diversity effects.

In one embodiment, the antenna ports in the K1 antenna port groups and the antenna ports in the K2 antenna port groups do not overlap.

In one embodiment, the K1 antenna port groups, and the first proportional sequence are used to generate a first transmitting beamforming vector, while the K2 antenna port groups and the second proportional sequence are used to generate a second transmitting beamforming vector. The first transmitting beamforming vector and the first receiving beamforming vector are used for beamforming of data transmission over a first time window; the second transmitting beamforming vector and the second receiving beamforming vector are used for beamforming of data transmission over a second time window. The first time window and the second time window are orthogonal in time domain.

In one embodiment, the first target channel quality is a function of the K1 channel quality values and the second target channel quality is a function of the K2 channel quality values. The first transmitting beamforming vector is used preferentially when the first target channel quality is higher than the second target channel quality.

In one embodiment, the first target channel quality and the second target channel quality are respectively a weighted average of the K1 channel quality values and the K2 channel quality values. The first proportional sequence and the second proportional sequence are used for the weighted average respectively.

In one embodiment, the first target channel quality and the second target channel quality are respectively an average of the K1 channel quality values and the K2 channel quality values.

In one embodiment, the transmitting beamforming vector and the receiving beamforming vector are analog beamforming vectors.

In one embodiment, any two antenna port groups in the K1 antenna port groups are co-located or quasi-co-located (QCL), and any two antenna port groups in the K2 antenna port groups are co-located or quasi-co-located (QCL); or any two antenna port groups in the K1 antenna port groups are on a same carrier, and any two antenna port groups in the K2 antenna port groups are on a same carrier.

In the embodiments, an advantage of the above method is that the base station can utilize the first proportional sequence more efficiently by using the K1 antenna port groups to indicate the co-located (quasi-co-located) or co-carrier antenna ports.

In one embodiment, the first signaling is used to determine the co-located or QCL information.

In one embodiment, the first signaling explicitly indicates the co-located or QCL information.

In one embodiment, the first signaling implicitly indicates the co-located or QCL information.

In one embodiment, the first signaling is used to determine information of the co-carrier.

In one embodiment, the first signaling explicitly indicates the information of the co-carrier.

In one embodiment, the first signaling implicitly indicates the information of the co-carrier.

In one embodiment, the first signaling is also used to determine at least the last one of the K1, the K2 and the target threshold. A third channel quality is a best channel quality value of the K2 channel quality values. A fourth channel quality is the worst channel quality value of the K2 channel quality values. The ratio between the fourth channel quality and the third channel quality is greater than or equal to the target threshold.

In the embodiments, the advantage of the above method is that the target threshold can be used to control the reporting overhead, thereby improving the reporting efficiency.

In one embodiment, the unit of the target threshold is dB.

In one embodiment, the first signaling explicitly indicates at least the last of the K1, the K2 and the target threshold.

In one embodiment, the first signaling implicitly indicates at least the last of the K1, the K2 and the target threshold.

In one embodiment, the first signaling is transmitted in a plurality of messages.

In one embodiment, the first information is further used to determine at least one of the first channel quality or the third channel quality.

In the embodiments, the advantage of the above method is that the base station may approximately recover the K1 channel qualities (the K2 channel qualities) by using the first channel quality (the third channel quality) and the first proportional sequence (the second proportional sequence), thereby improving flexibility for beam generation and scheduling.

In one embodiment, the first information is transmitted in a plurality of messages.

In one embodiment, the portion of the first information used to determine the first channel quality (the third channel quality) is transmitted in a measurement report; the portion of the first information used to determine the K1 antenna port groups, and the first proportional sequence (the K2 antenna port groups and the second proportional sequence) is transmitted in a CSI report.

In one embodiment, the method for multi-antenna transmission in a UE further comprises:

receiving a second wireless signal;

wherein a target antenna port group is used to transmit the second wireless signal; the target antenna port group is associated with the K1 antenna port groups and the first proportional sequence, or the target antenna port group is associated with the K2 antenna port groups and the second proportional sequence.

In the embodiment, the above method has the advantages that the beamforming vector corresponding to the K1 antenna port groups and the first proportional sequence, or the beamforming vector corresponding to the K2 antenna port groups and the second proportional sequence are used for beamforming of the second wireless signal to increase beamforming gain acting on the second wireless signal.

In one embodiment, the transmitting beamforming vector corresponding to the K1 antenna port groups is used to generate a transmitting beamforming vector of the second wireless signal.

In one embodiment, the transmitting beamforming vector corresponding to the K2 antenna port groups is used to generate a transmitting beamforming vector of the second wireless signal.

In one embodiment, when the transmitting beamforming vector corresponding to the K1 antenna port groups is used to generate a transmitting beamforming vector of the second wireless signal, the first receiving beamforming vector is used to receive the second a wireless signal; when the transmitting beamforming vector corresponding to the K2 antenna port groups is used to generate a transmit beamforming vector of the second wireless signal, the second receiving beamforming vector is used for receive the he second wireless signal.

In one embodiment, the transmitting beamforming vector and the receiving beamforming vector are analog beamforming vectors.

In one embodiment, the second wireless signal is a signal carried by a PDCCH.

In one embodiment, the second wireless signal is a signal carried by a PDSCH.

In one embodiment, the second wireless signal is a reference signal.

The present disclosure provides a method for multi-antenna transmission in a base station, including:

transmitting a first signaling;

transmitting a first wireless signal; and receiving first information;

wherein, K antenna port groups are used to transmit the first wireless signal; the first signaling is used to determine the K antenna port groups; the K is a positive integer greater than 1; the K antenna port groups respectively correspond to K channel quality values; the K channel quality values are K non-negative real numbers; K1 antenna port groups of the K antenna port groups correspond to K1 channel quality values of the K channel quality values; the K1 is a positive integer less than or equal to the K; a first proportional sequence corresponds to a ratio(ratios) among the K1 channel quality values; the first information is used to determine the K1 antenna port groups and the first proportional sequence; the first signaling is used to determine a target threshold; the target threshold is a non-negative real number; a first channel quality is a best channel quality value among the K1 channel quality values; a second channel quality is a worse channel quality value among the K1 channel quality values; a ratio between the second channel quality and the first channel quality is greater than or equal to the target threshold.

In one embodiment, the K1 beamforming vectors and the first proportional sequence respectively corresponding to the K1 antenna port groups are used to generate a service beam for data transmission with the UE.

In one embodiment, the base determines a correspondence between a service beam related to a relative position of the UE and the collection of the K1 antenna ports and the first proportional sequence according to the coverage space, and then determines the service beam according to the K1 antenna ports and the first proportional sequence reported by the UE.

In one embodiment, a correspondence table is stored in the base station. The correspondence table is used to determine a correspondence between a service beam of the UE and the collection of the K1 antenna ports and the first proportional sequence. The base station retrieves the correspondence table according to the first antenna port group, the second antenna port group and the first proportional sequence to obtain an analog beam direction for communication with the UE.

In one embodiment, the K1 beamforming vectors and the first proportional sequence respectively corresponding to the K1 antenna port groups are used to generate a signal for the next beam scanning. The variables of the generation function of the plurality of beamforming vectors used by the signal are the K1 beamforming vectors and the first proportional sequence.

In one embodiment, a center of the coverage space of the plurality of beamforming vectors is determined by the K1 antenna port groups and the first proportional sequence.

In one embodiment, the K channel quality values are wideband channel quality values.

In one embodiment, the first proportional sequence comprises K1 positive real numbers less than or equal to 1, and the first proportional sequence comprises at least one 1; or the first proportional sequence comprises quantized values corresponding to K1 positive real numbers; Or the first proportional sequence includes K1-1 positive real number(s), and the K1-1 positive real numbers is(are) a ratio(ratios) between the channel quality values other than the best channel quality value among the K1 channel quality values and the best channel quality value; or the first proportional sequence comprises a quantized value(s) corresponding to K1-1 positive real number(s).

In one embodiment, K2 antenna port groups in the K antenna port groups correspond to K2 channel quality values in the K channel quality values; the K2 is a positive integer less than or equal to the K; a second proportional sequence corresponds to a ratio among the K2 channel quality values; a first receiving beamforming vector is used to receive signals transmitted through the K1 antenna port groups; a second receiving beamforming vector is used to receive signals transmitted through the K2 antenna port groups; the first receiving beamforming vector and the second receive beamforming vector are different; the first information is further used to determine the K2 antenna port groups and the second proportional sequence.

In one embodiment, the first information is further used by the base station to determine the first receive beamforming vector and the second receive beamforming vector.

In one embodiment, the first information explicitly indicates the first receive beamforming vector and the second receive beamforming vector.

In one embodiment, the first information implicitly indicates the first receive beamforming vector and the second receive beamforming vector.

In one embodiment, any two antenna port groups in the K1 antenna port groups are co-located or quasi-co-located (QCL), and any two antenna port groups in the K2 antenna port groups are co-located or quasi-co-located (QCL); or any two antenna port groups in the K1 antenna port groups are on a same carrier, and any two antenna port groups in the K2 antenna port groups are on a same carrier.

In one embodiment, the base station generates a service beam by using a co-located (quasi-co-located) or a co-carrier beamforming vector and its corresponding proportional sequence.

In one embodiment, the first signaling is further used to determine at least the last one of the K1, the K2, or the target threshold. A third channel quality is a best channel quality value among the K2 channel quality values. A fourth channel quality is a worse channel quality value among the K2 channel quality values. A ratio between the fourth channel quality and the third channel quality is greater than or equal to the target threshold In one embodiment, the base station controls reporting overhead by K1, the K2, and the target threshold.

In one embodiment, the first information is further used to determine at least one of the first channel quality or the third channel quality.

In one embodiment, the base station approximately recovers the K1 channel quality values in combination with the first channel quality, the K1 antenna port groups and the first proportional sequence for multi-user MIMO scheduling.

In one embodiment, the base station approximately recovers the K2 channel quality values in combination with the third channel quality, the K2 antenna port groups and the second proportional sequence for multi-user MIMO scheduling.

In one embodiment, the method for multi-antenna transmission in a base station further includes:
 transmitting a second wireless signal;
 wherein a target antenna port group is used to transmit the second wireless signal; the target antenna port group is associated with the K1 antenna port groups and, or the target antenna port group is associated with the K2 antenna port groups and the second proportional sequence.

In one embodiment, the K1 beamforming vectors and corresponding to the K1 antenna port groups are used to generate a target beamforming vector. The target beamforming vector is used for beamforming of the target antenna port group.

In one embodiment, the K2 beamforming vectors and corresponding to the K2 antenna port groups are used to generate a target beamforming vector. The target beamforming vector is used for beamforming of the target antenna port group.

The present disclosure provides a user equipment (UE) for multi-antenna transmission, including:
 a first receiver, receiving a first signaling;
 a second receiver, receiving a first wireless signal; and
 a third transmitter, transmitting first information;
 wherein, K antenna port groups are used to transmit the first wireless signal; the first signaling is used to determine the K antenna port groups; the K is a positive integer greater than 1; the K antenna port groups respectively correspond to K channel quality values; the K channel quality values are K non-negative real numbers; K1 antenna port groups of the K antenna port groups correspond to K1 channel quality values of the K channel quality values; the K1 is a positive integer less than or equal to the K; a first proportional sequence corresponds to a ratio(ratios) among the K1 channel quality values; the first information is used to determine the K1 antenna port groups and; the first signaling is used to determine a target threshold; the target threshold is a non-negative real number; a first channel quality is a best channel quality value among the K1 channel quality values; a second channel quality is a worse channel quality value among the K1 channel quality values; a ratio between the second channel quality and the first channel quality is greater than or equal to the target threshold.

In one embodiment of the above user equipment, the K channel quality values are broadband channel quality values.

In one embodiment of the above user equipment, includes K1 positive real numbers less than or equal to 1, and comprises at least one 1; or the first proportional sequence comprises quantized values corresponding to K1 positive real numbers; the first proportional sequence comprises K1-1 positive real numbers, and the K1-1 positive real numbers is(are) a ratio(ratios) between the channel quality values other than the best channel quality value among the K1 channel quality values and the best channel quality value; or the first proportional sequence comprises a quantized value(s) corresponding to K1-1 positive real number(s).

In one embodiment, K2 antenna port groups in the K antenna port groups correspond to K2 channel quality values in the K channel quality values; the K2 is a positive integer less than or equal to the K; a second proportional sequence corresponds to a ratio among the K2 channel quality values; a first receiving beamforming vector is used to receive signals transmitted through the K1 antenna port groups; a second receiving beamforming vector is used to receive signals transmitted through the K2 antenna port groups; the first receiving beamforming vector and the second receiving beamforming vector are different; the first information is further used to determine the K2 antenna port groups and the second proportional sequence.

In one embodiment of the above user equipment, any two antenna port groups in the K1 antenna port groups are co-located or quasi-co-located (QCL), and any two antenna port groups in the K2 antenna port groups are co-located or quasi-co-located (QCL); or any two antenna port groups in the K1 antenna port groups are on a same carrier, and any two antenna port groups in the K2 antenna port groups are on a same carrier.

In one embodiment of the above user equipment, the first signaling is also used to determine at least the last one of the K1, the K2, or the target threshold. A third channel quality is a best channel quality value of the K2 channel quality values. A fourth channel quality is the worst channel quality value of the K2 channel quality values. The ratio between the fourth channel quality and the third channel quality is greater than or equal to the target threshold.

In one embodiment of the above user equipment, the first information is further used to determine at least one of the first channel quality or the third channel quality.

In one embodiment of the above user equipment, the second receiver further receives a second wireless signal; wherein a target antenna port group is used to transmit the second wireless signal; the target antenna port group is associated with the K1 antenna port groups and the first proportional sequence; or the target antenna port group is associated with the K2 antenna port groups and the first proportional sequence.

The present disclosure provides a base station for multi-antenna transmission, including:

a first transmitter, transmitting a first signaling;

a second transmitter, transmitting a first wireless signal; and a third receiver, receiving first information;

wherein, K antenna port groups are used to transmit the first wireless signal; the first signaling is used to determine the K antenna port groups; the K is a positive integer greater than 1; the K antenna port groups respectively correspond to K channel quality values; the K channel quality values are K non-negative real numbers; K1 antenna port groups of the K antenna port groups correspond to K1 channel quality values of the K channel quality values; the K1 is a positive integer less than or equal to the K; a first proportional sequence corresponds to a ratio(ratios) among the K1 channel quality values; the first information is used to determine the K1 antenna port groups and the first proportional sequence; the first signaling is used to determine a target threshold; the target threshold is a non-negative real number; a first channel quality is a best channel quality value among the K1 channel quality values; a second channel quality is a worse channel quality value among the K1 channel quality values; a ratio between the second channel quality and the first channel quality is greater than or equal to the target threshold.

In one embodiment of the above base station, the K channel quality values are broadband channel quality values.

In one embodiment of the above base station, the first proportional sequence includes K1 positive real numbers less than or equal to 1, and the first proportional sequence comprises at least one 1; or the first proportional sequence comprises quantized values corresponding to K1 positive real numbers; the first proportional sequence comprises K1-1 positive real numbers, and the K1-1 positive real numbers is(are) a ratio(ratios) between the channel quality values other than the best channel quality value among the K1 channel quality values and the best channel quality value; or the first proportional sequence comprises a quantized value(s) corresponding to K1-1 positive real number(s).

In one embodiment, K2 antenna port groups in the K antenna port groups correspond to K2 channel quality values in the K channel quality values; the K2 is a positive integer less than or equal to the K; a second proportional sequence corresponds to a ratio among the K2 channel quality values; a first receiving beamforming vector is used to receive signals transmitted through the K1 antenna port groups; a second receiving beamforming vector is used to receive signals transmitted through the K2 antenna port groups; the first receiving beamforming vector and the second receiving beamforming vector are different; the first information is further used to determine K2 antenna port groups and the second proportional sequence.

In one embodiment of the above base station, any two antenna port groups in the K1 antenna port groups are co-located or quasi-co-located (QCL), and any two antenna port groups in the K2 antenna port groups are co-located or quasi-co-located (QCL); or any two antenna port groups in the K1 antenna port groups are on a same carrier, and any two antenna port groups in the K2 antenna port groups are on a same carrier.

In one embodiment of the above base station, the first signaling is also used to determine at least the last one of the K1, the K2, or the target threshold. A third channel quality is a best channel quality value of the K2 channel quality values. A fourth channel quality is the worst channel quality value of the K2 channel quality values. The ratio between the fourth channel quality and the third channel quality is greater than or equal to the target threshold.

In one embodiment of the above base station, the first information is further used to determine at least one of the first channel quality or the third channel quality.

In one embodiment of the above base station, the second receiver further receives a second wireless signal; wherein a target antenna port group is used to transmit the second wireless signal; the target antenna port group is associated with the K1 antenna port groups and the first proportional sequence; or the target antenna port group is associated with the K2 antenna port groups and the first proportional sequence.

Compared with the prior art, the present disclosure has the following advantages:

The service beam may be generated and used more flexibly through reporting channel quality ratios to increase beamforming gain.

The robustness and flexibility of subsequent transmissions are increased by multiple sets of reports for varied receiving beamforming.

The flexibility of multi-user scheduling of the base station is increased by the reporting of the best channel quality, combined with the reporting of the channel quality ratio.

BRIEF DESCRIPTION OF THE DRAWINGS

Other features, objects, and advantages of the present disclosure will become more apparent from the detailed description of the accompanying drawings.

DESCRIPTION OF THE EMBODIMENTS

Embodiment 1

Figure 1:
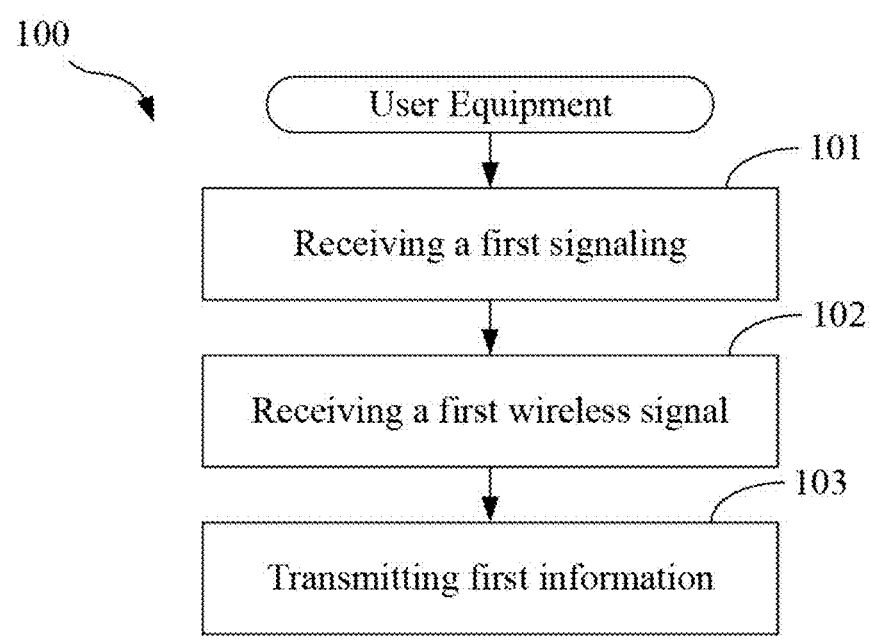
FIG. 1 shows a flow chart of transmission of a first signaling, a first wireless signal, and first information in accordance with one embodiment of the present disclosure.

Embodiment 1 illustrates a flow chart of transmission of a first signaling, a first wireless signal, and first information in accordance with one embodiment of the present disclosure, as shown in FIG. 1. In FIG. 1, each box represents a step. In Embodiment 1, the user equipment in this disclosure receives a first signaling, receives a first wireless signal, and transmits a first information in sequence. K antenna port groups are used to transmit the first wireless signal. The first signaling is used to determine the K antenna port groups. The K is a positive integer greater than 1. The K antenna port groups respectively correspond to K channel quality values. The K channel quality values are K non-negative real numbers. K1 antenna port groups of the K antenna port groups correspond to K1 channel quality values of the K channel quality values. the K1 is a positive integer less than or equal to the K. A first proportional sequence corresponds to a ratio(ratios) among the K1 channel quality values. The first information is used to determine the K1 antenna port groups and the first proportional sequence.

As a sub-embodiment, the first signaling is a higher layer signaling.

As a sub-embodiment, the first signaling is an RRC signaling.

As a sub-embodiment, the first signaling is used to determine configuration of Channel State Information report (CSI).

As a sub-embodiment, the first signaling is an RRC signaling for configuring CSI-RS.

As a sub-embodiment, the first signaling is an RRC signaling for configuring a beamformed CSI-RS (Beamformed CSI-RS).

As a sub-embodiment, the first signaling is a physical layer signaling.

As a sub-embodiment, the first signaling is carried by a PDCCH.

As a sub-embodiment, the first signaling is used to activate RRC pre-configuration.

As a sub-embodiment, the K antenna port groups respectively correspond to K reference signal groups.

As a sub-embodiment, the antenna port group includes only one antenna port.

As a sub-embodiment, the reference signal group includes only one reference signal.

As a sub-embodiment, the K is one of 2, 4, 8, 12, 16, 24, and 32.

As a sub-embodiment, the reference signal is CSI-RS.

As a sub-embodiment, the reference signal is SS.

As a sub-embodiment, the first wireless signal is composed of the K reference signal groups.

As a sub-embodiment, the first wireless signal is composed of K beam-formed CSI-RSs.

As a sub-embodiment, the channel quality value is one of RSRP, SINR, and SNR.

As a sub-embodiment, the channel quality values are wideband channel quality values.

As a sub-embodiment, a wideband channel measurement is used to determine the wideband channel quality values.

As a sub-embodiment, the wideband channel measurement refers to a channel measurement value for the entire system bandwidth obtained by measuring a channel on the entire system bandwidth.

As a sub-embodiment, the wideband channel measurement refers to a channel measurement value for the entire subcarrier bandwidth obtained by measuring a channel on the entire sub-carrier bandwidth.

As a sub-embodiment, the broadband is composed of a plurality of sub-bands, and the sub-bands are composed of one or more Resource Blocks (RBs).

As a sub-embodiment, one RB includes 12 subcarriers.

As a sub-embodiment, one sub-band includes 5 RBs.

As a sub-embodiment, the wideband includes 10 subbands.

As a sub-embodiment, the K1 is smaller than the K.

As a sub-embodiment, the K1 is one of 2, 3, and 4.

As a sub-embodiment, the first signaling is used to determine the K.

As a sub-embodiment, the first signaling is used to determine the K1.

As a sub-embodiment, the K1 channel quality values are a best channel quality values among the K channel quality values.

As a sub-embodiment, the first information is used to determine the K1 antenna port groups and the first proportional sequence.

As a sub-embodiment, the first proportional sequence is composed of K1 non-negative real numbers not greater than one.

As a sub-embodiment, the first proportional sequence is composed of K1 positive real numbers not greater than one.

As a sub-embodiment, the first information is used to determine K1-1 non-negative real number(s), and the K1-1 positive real number(s) is(are) a ratio(s) between the channel quality values other than the best channel quality value among the K1 channel quality values and the best channel quality value.

As a sub-embodiment, the first information is used to determine quantized values corresponding to the K1-1 non-negative real number(s).

As a sub-embodiment, any one of the K1-1 non-negative real number(s) is not less than 0 and not greater than 1.

As a sub-embodiment, the K1-1 non-negative real number(s) is(are) used to determine the first proportional sequence.

As a sub-embodiment, the first information is carried by a PUCCH.

As a sub-embodiment, the first signal is carried by a PUSCH.

As a sub-embodiment, the first information is Uplink Control Information (UCI).

Embodiment 2

Figure 2:
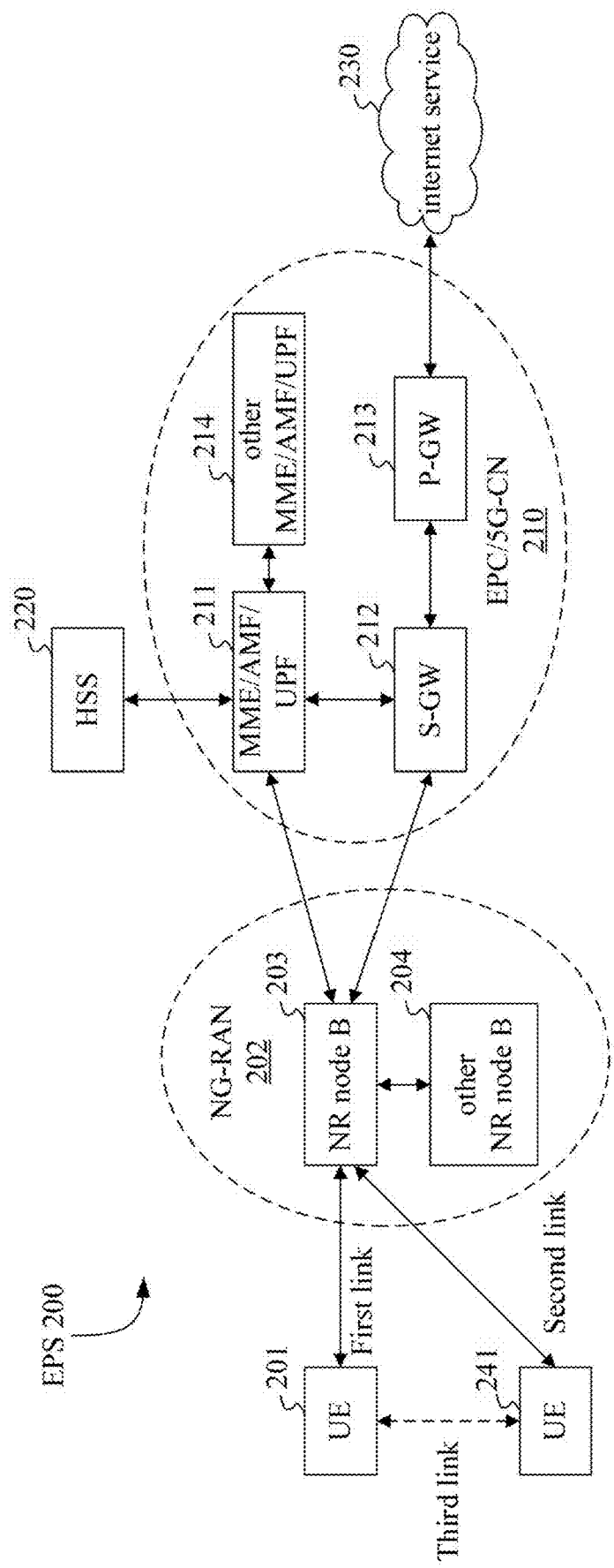
FIG. 2 shows a schematic diagram of a network architecture in accordance with one embodiment of the present disclosure.

Embodiment 2 illustrates a schematic diagram of a network architecture in accordance with the present disclosure, as shown in FIG. 2. FIG. 2 illustrates a network structure 200 of NR 5G, long-term evolution (LTE) and long-term evolution advanced (LTE-A) systems. The network architecture 200 of NR 5G or LTE may be referred to as an evolve packet system (EPS) 200 or some other suitable terminology. The EPS 200 may include one or more UEs 201, an NG-RAN 902, an Evolved Packet Core (EPC)/5G-Core Network (5G-CN) 210, a home subscriber server (HSS) 220 and an internet service 230. The EPS 200 may be interconnected with other access networks, but for the sake of simplicity, these entities/interfaces are not shown. As shown in FIG. 2, the EPS provides packet switching services. Those skilled in the art would readily appreciate that the various concepts presented throughout this disclosure can be extended to networks or other cellular networks that provide circuit switching services. The NG-RAN comprises an NR Node B (gNB) 203 and other gNBs 204. The gNB 203 provides user and control plane protocol terminations for the UE 201. The gNB 203 can be connected to other gNBs 204 via an Xn interface (e.g., a backhaul). The gNB 203 may also be referred to as a base station, a base transceiver station, a radio base station, a radio transceiver, a transceiver function, a basic service set (BSS), an extended service set (ESS), a transmission and reception point (TRP), or some other suitable terminology. The gNB 203 provides the UE 201 with an access point to the EPC/5G-CN 210. In the embodiment, the UE 201 comprises cellular telephones, smart phones, Session Initiation Protocol (SIP) phones, laptop computers, personal digital assistants (PDAs), satellite radios, non-ground base station communications, satellite mobile communications, global positioning systems, multimedia devices, video devices, digital audio player (e.g. MP3 players), cameras, game consoles, drones, aircrafts, narrowband physical network devices, machine type communication devices, land vehicles, cars, wearable devices, or any other similar to functional devices. A person skilled in the art may also refer to UE 201 as a mobile station, a subscriber station, a mobile unit, a subscriber unit, a radio unit, a remote unit, a mobile device, a radio device, a radio communication device, a remote device, a mobile subscriber station, an access terminal, a mobile terminal, a radio terminal, remote terminal, handset, user agent, mobile client, client or some other suitable term. The gNB 203 is connected to the EPC/5G-CN 210 through an S1/NG interface. The EPC/5G-CN 210 comprises an MME/AMF/UPF 211, other MMEs/AMFs/UPFs 214, a Service Gateway (S-GW) 212 and a Packet Date Network Gateway (P-GW) 213. The MME/AMF/UPF 211 is a control node that handles a signaling between the UE 201 and the EPC/5G-CN 210. In general, the MME/AMF/UPF 211 provides carrier and connection management. All User Internet Protocol (IP) packets are transmitted through the S-GW 212, and the S-GW 212 itself is connected to the P-GW 213. The P-GW 213 provides UE IP address allocation as well as other functions. The P-GW 213 is connected to the internet service 230. The internet service 230 includes an operator-compatible internet protocol service, and may specifically include the Internet, an intranet, an IP Multimedia Subsystem (IMS), and a PS streaming service (PSS).

As a sub-embodiment, the UE 201 corresponds to the user equipment in this disclosure.

As a sub-embodiment, the gNB 203 corresponds to the base station in the present disclosure.

As a sub-embodiment, the UE 201 supports multi-antenna transmission.

As a sub-embodiment, the UE 201 supports wideband channel measurement.

As a sub-embodiment, the gNB 203 supports multi-antenna transmission.

As a sub-embodiment, the gNB 203 supports wideband beamforming.

Embodiment 3

Figure 3:
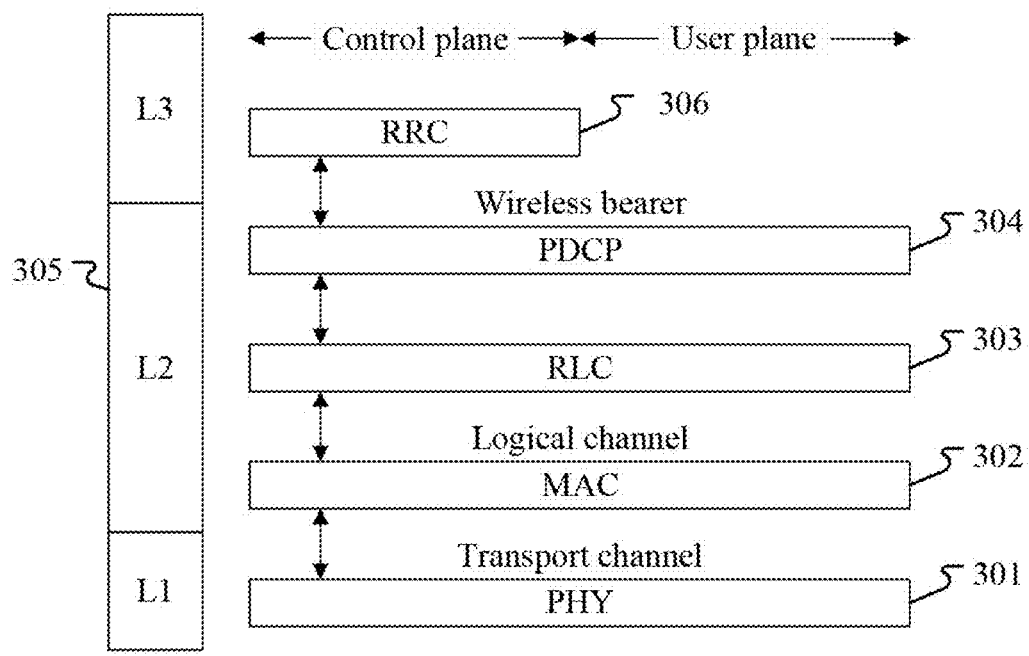
FIG. 3 shows a schematic diagram of a radio protocol architecture of a user plane and a control plane according to an embodiment of the present disclosure.

Embodiment 3 illustrates a schematic diagram of a radio protocol architecture of a user plane and a control plane according to an embodiment of the present disclosure, as shown in FIG. 3. FIG. 3 is a schematic diagram illustrating an embodiment of a radio protocol architecture for a user plane and a control plane, and FIG. 3 illustrates a radio protocol architecture for the UE and the base station equipment (gNB or eNB) in three layers: layer 1, layer 2 and layer 3. The Layer 1 (L1 layer) is the lowest layer and implements various signal processing functions of the physical layer (i.e., PHY). The L1 layer will be referred to herein as PHY 301. The Layer 2 (L2 layer) 305 is above PHY 301 and is responsible for the link between the UE and the gNB through PHY 301. In the user plane, L2 layer 305 comprises a media access control (MAC) sub-layer 302, a radio link control (RLC) sub-layer 303 and a packet data convergence protocol (PDCP) sub-layer 304, and these sub-layers terminate at the gNB of the network side. Although not illustrated in FIG. 3, the UE may have several upper layers above the L2 layer 305, including a network layer (i.e., an IP layer) terminated at the P-GW of the network side and an application layer terminated at the other side of the connection (i.e., a peer UE, server, etc.). The PDCP sub-layer 304 provides multiplexing between different radio bearers and logical channels. The PDCP sublayer 304 also provides header compression for an upper layer packet to reduce a radio transmission overhead, provides security by encrypting a packet, and provides support for UE handover between gNBs. The RLC sublayer 303 provides segmentation and reassembling of an upper layer data packet, retransmission of a lost packets and reordering of a packet to compensate for the disordered reception resulted from the hybrid automatic repeat request (HARQ). The MAC sublayer 302 provides multiplexing between a logical channel and a transport channel. The MAC sublayer 302 is also responsible for allocating various radio resources (i.e., resource blocks) in one cell between UEs. The MAC sublayer 302 is also responsible for HARQ operation. In the control plane, the radio protocol architecture for the UE and gNB is substantially the same as the radio protocol architecture in the user plane on the physical layer 301 and the L2 layer 305, but there is no header compression function for the control plane. The control plane also comprises a Radio Resource Control (RRC) sublayer 306 in Layer 3 (L3 layer). The RRC sublayer 306 is responsible for obtaining radio resources (i.e. radio bearers) and configuring the lower layer using an RRC signaling between the gNB and the UE.

In one embodiment, the radio protocol architecture of FIG. 3 is applicable to the user equipment in this disclosure.

In one embodiment, the radio protocol architecture of FIG. 3 is applicable to the base station in this disclosure.

As a sub-embodiment, the first signaling in the present disclosure is generated in the RRC sublayer 306.

As a sub-embodiment, the first signaling in the present disclosure is generated by the PHY 301.

As a sub-embodiment, the first wireless signal in the present disclosure is generated by the PHY 301.

As a sub-embodiment, the first information in the present disclosure is generated by the PHY 301.

Embodiment 4

Figure 4:
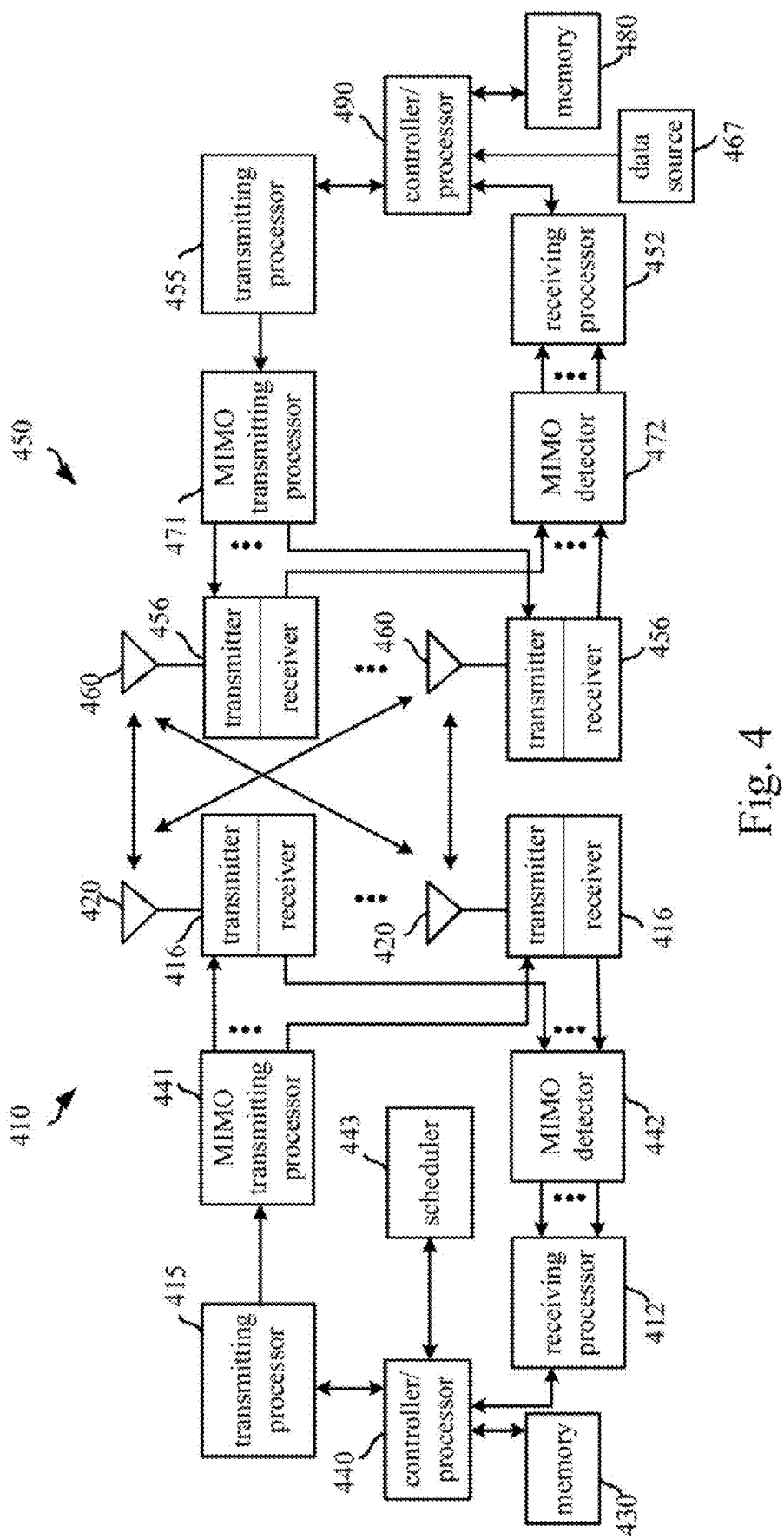
FIG. 4 shows a schematic diagram of a base station device and a given user equipment according to an embodiment of the present disclosure.

Embodiment 4 shows a schematic diagram of a base station device and a given user equipment according to the present disclosure, as shown in FIG. 4. FIG. 4 is a block diagram of a gNB 410 in communication with a UE 450 in an access network.

The base station (410) may comprise a controller/processor 440, a scheduler 443, a memory 430, a receiving processor 412, a transmitting processor 415, a MIMO transmitting processor 441, a MIMO detector 442, a transmitter/receiver 416, and an antenna 420.

The user equipment (UE 450) may comprise a controller/processor 490, a memory 480, a data source 467, a transmitting processor 455, a receiving processor 452, a MIMO transmitting processor 471, a MIMO detector 472, a transmitter/receiver 466, and an antenna 460.

In Downlink (DL) transmission, the processing associated with the base station (410) may include the following operations:

The upper layer packet is provided to the controller/processor 440. The controller/processor 440 provides header compression, encryption, packet segmentation and reordering, and multiplexing between a logical channel and a transport channel so as to implement L2 layer protocols for the user plane and the control plane. The upper layer packet may include data or control information, such as a Downlink Shared Channel (DL-SCH).

The controller/processor 440 can be associated with the memory 430 that stores program codes and data. The memory 430 can be a computer readable medium.

The controller/processor 440 notifies the scheduler 443 to transmit the demand. The scheduler 443 is configured to schedule the air interface resource corresponding to the transmission requirement, and notify the controller/processor 440 of the scheduling result.

The transmitting processor 415 receives the output bitstream of controller/processor 440, and implements various signal transmission processing functions for the L1 layer (i.e., the physical layer), including encoding, interleaving, scrambling, modulation, power control/allocation and generation of physical layer control signaling (including PBCH, PDCCH, PHICH, PCFICH, a reference signal), etc.

The MIMO transmitting processor 441 performs spatial processing for data symbols, control symbols or reference signal symbols (such as precoding, beam shaping), and outputs baseband signals to the transmitter 416.

The transmitter 416 is configured to convert the baseband signal provided by the MIMO transmitting processor 441 into a radio frequency signal and to transmit the radio frequency signal via the antenna 420. Each transmitter 416 samples the respective input symbol streams to obtain a respective sampled signal stream. Each transmitter 416 performs further processing (e.g., digital to analog conversion, amplification, filtering, upconversion, etc.) on a respective sampled stream to obtain a downlink signal.

In Downlink (DL) transmission, the processing associated with the user equipment (UE 450) may include the following operations:

The receiver 456 is configured to convert the radio frequency signal received through the antenna 460 into a baseband signal and provide the baseband signal to the MIMO detector 472.

The MIMO detector 472 is configured to perform MIMO detection on the signal received from the receiver 456, and provide the MIMO-detected baseband signal to the receiving processor 452.

The receiving processor 452 implements various signal receiving processing functions for the L1 layer (i.e., the physical layer) including decoding, deinterleaving, descrambling, demodulation, and physical layer control signaling extraction, etc.

The controller/processor 490 receives the bitstream output by the receive processor 452. The controller/processor 490 provides header compression, encryption, packet segmentation and reordering, and multiplexing between a logical channel and a transport channel to implement L2 layer protocols for the user plane and the control plane.

The controller/processor 490 can be associated with the memory 480 that stores program codes and data. The memory 480 can be a computer readable medium.

The first signaling in the present disclosure may be generated by the transmitting processor 415 or transmitted to the controller/processor 440 by higher layer signaling. The scheduler 443 schedules the air interface resources occupied by the first signaling. The MIMO transmission processor 441 performs multi-antenna precoding processing on the symbols output by the transmission processor. The transmitter 416 converts the baseband signal provided by the MIMO transmitting processor 441 into a radio frequency signal and transmits the radio frequency signal via the antenna 420. The receiver 456 converts the radio frequency signal received by the antenna 460 and the first signaling into a baseband signal and provides the baseband signal to the MIMO detector 472. The MIMO detector 472 performs MIMO detection on the signal received from the receiver 456. The receiving processor 452 processes the baseband signal output by the MIMO detector 472 to obtain the first signaling or transmits the baseband signal to the controller/processor 440 for further processing related to a higher layer to obtain the first signaling.

The first wireless signal in the present disclosure is K reference signal groups generated by the transmitting processor 415. The MIMO transmitting processor 441 performs beamforming processing on the K reference signal groups output by the transmitting processor, and transmits the K reference signal groups to the K antenna port groups for transmission. The transmitter 416 converts the baseband signal provided by the MIMO transmitting processor 441 into a radio frequency signal and transmits the radio frequency signal via the antenna 420. The receiver 456 converts the radio frequency signal received by the antenna 460 and the first radio signal into a baseband signal and provides the first radio signal to the MIMO detector 472. The MIMO detector 472 performs MIMO detection on the signal received from the receiver 456. The receiving processor 452 performs channel measurement based on the baseband signal output by the MIMO detector 472 and the K reference signal groups to obtain the K channel quality values.

In Uplink (UL) transmission, the processing associated with the user equipment (UE 450) may include the following operations:

The data source 467 provides an upper layer packet to the controller/processor 490. The controller/processor 490 provides header compression, encryption, packet segmentation and reordering, and multiplexing between logical and transport channels to implement L2 layer protocols for the user plane and the control plane. The upper layer packet may include data or control information, such as an Uplink Shared Channel (UL-SCH).

The controller/processor 490 can be associated with the memory 480 that stores program codes and data. The memory 480 can be a computer readable medium.

The transmitting processor 455 receives the bitstream output by the controller/processor 490, and implements various signal transmission processing functions for the L1 layer (i.e., the physical layer), including encoding, interleaving, scrambling, modulation, power control/allocation and generation of physical layer control signaling (including PUCCH, Sounding Reference Signal (SRS)), etc.

The MIMO transmitting processor 471 performs spatial processing for data symbols, control symbols or reference signal symbols (such as precoding, beam shaping), and outputs baseband signals to the transmitter 456.

The transmitter 456 is configured to convert the baseband signal provided by the MIMO transmitting processor 471 into a radio frequency signal and to transmit the radio frequency signal via the antenna 460. Each transmitter 456 samples the respective input symbol streams to obtain a respective sampled signal stream. Each transmitter 456 performs further processing (e.g., digital to analog conversion, amplification, filtering, upconversion, etc.) on the respective sample stream to obtain an uplink signal.

In Uplink (UL) transmission, the processing associated with the base station (410) may include the following operations:

The receiver 416 is configured to convert the radio frequency signal received by the antenna 420 into a baseband signal and provide the baseband signal to the MIMO detector 442.

The MIMO detector 442 is configured to perform MIMO detection on the signal received from the receiver 416, and provide the MIMO-detected baseband signal to the receiving processor 442.

The receiving processor 412 implements various signal receiving processing functions for the L1 layer (i.e., the physical layer) including decoding, deinterleaving, descrambling, demodulation, and physical layer control signaling extraction, etc.

The controller/processor 440 receives the bitstream output by the receiving processor 412. The controller/processor 490 provides header compression, encryption, packet segmentation and reordering, and multiplexing between a logical channel and a transport channel to implement L2 layer protocols for the user plane and the control plane.

The controller/processor 440 can be associated with the memory 430 that stores program codes and data. The memory 430 can be a computer readable medium.

The first information in the present disclosure may be generated by the transmitting processor 455 to the controller/processor 490. The MIMO transmitting processor 471 performs multi-antenna precoding processing on the symbols output by the transmitting processor. The transmitter 456 converts the baseband signal provided by the MIMO transmitting processor 471 into a radio frequency signal and transmits the radio frequency signal via the antenna 460. The receiver 416 converts the radio frequency signal related to the first information received by the antenna 420 into a baseband signal and provides the baseband signal to the MIMO detector 442. The MIMO detector 442 performs MIMO detection on the signal received from the receiver 416. The receiving processor 412 processes the baseband signal output by the MIMO detector 442 to obtain the first information.

As a sub-embodiment, the UE 450 includes: at least one processor and at least one memory. The at least one memory includes computer program code. The at least one memory and the computer program code are configured to use with the at least one processor together. The UE 450 at least: receives a first signaling; receives a first wireless signal; and transmits first information; wherein, K antenna port groups are used to transmit the first wireless signal; the first signaling is used to determine the K antenna port groups; the K is a positive integer greater than 1; the K antenna port groups respectively correspond to K channel quality values; the K channel quality values are K non-negative real numbers; K1 antenna port groups of the K antenna port groups correspond to K1 channel quality values of the K channel quality values; the K1 is a positive integer less than or equal to the K; a first proportional sequence corresponds to a ratio(ratios) among the K1 channel quality values; the first information is used to determine the K1 antenna port groups and the first proportional sequence.

As a sub-embodiment, the UE 450 includes: a memory storing a computer readable instruction program that, when executed by at least one processor, performs operations. The operations include: receiving a first signaling; receiving a first wireless signal; and transmitting first information; wherein, K antenna port groups are used to transmit the first wireless signal; the first signaling is used to determine the K antenna port groups; the K is a positive integer greater than 1; the K antenna port groups respectively correspond to K channel quality values; the K channel quality values are K non-negative real numbers; K1 antenna port groups of the K antenna port groups correspond to K1 channel quality values of the K channel quality values; the K1 is a positive integer less than or equal to the K; a first proportional sequence corresponds to a ratio(ratios) among the K1 channel quality values; the first information is used to determine the K1 antenna port groups and the first proportional sequence.

As a sub-embodiment, the gNB 410 includes: at least one processor and at least one memory. The at least one memory includes computer program code. The at least one memory and the computer program code are configured to use with the at least one processor together. The UE 450 at least: transmits a first signaling; transmits a first wireless signal; and receives first information; wherein, K antenna port groups are used to transmit the first wireless signal; the first signaling is used to determine the K antenna port groups; the K is a positive integer greater than 1; the K antenna port groups respectively correspond to K channel quality values; the K channel quality values are K non-negative real numbers; K1 antenna port groups of the K antenna port groups correspond to K1 channel quality values of the K channel quality values; the K1 is a positive integer less than or equal to the K; a first proportional sequence corresponds to a ratio(ratios) among the K1 channel quality values; the first information is used to determine the K1 antenna port groups and the first proportional sequence.

As a sub-embodiment, the UE 450 includes: a memory storing a computer readable instruction program that, when executed by at least one processor, performs operations. The operations include: transmitting a first signaling; transmitting a first wireless signal; and receiving first information; wherein, K antenna port groups are used to transmit the first wireless signal; the first signaling is used to determine the K antenna port groups; the K is a positive integer greater than 1; the K antenna port groups respectively correspond to K channel quality values; the K channel quality values are K non-negative real numbers; K1 antenna port groups of the K antenna port groups correspond to K1 channel quality values of the K channel quality values; the K1 is a positive integer less than or equal to the K; a first proportional sequence corresponds to a ratio(ratios) among the K1 channel quality values; the first information is used to determine the K1 antenna port groups and the first proportional sequence.

As a sub-embodiment, the UE 450 corresponds to the user equipment in this disclosure.

As a sub-embodiment, the gNB 410 corresponds to the base station in the present disclosure.

As a sub-embodiment, at least the first three of the receiver 456, the MIMO detector 472, the receiving processor 452, and the controller/processor 490 are used to receive the first signaling in the present disclosure.

As a sub-embodiment, at least the first three of the transmitter 416, the MIMO transmitter 441, the transmitting processor 415, and the controller/processor 440 are used to transmit the first signaling in this disclosure.

As a sub-embodiment, the receiver 456, the MIMO detector 472 and the receiving processor 452 are used to receive the first wireless signal in the present disclosure.

As a sub-embodiment, the transmitter 416, the MIMO transmitter 441 and the transmit processor 415 are used to transmit the first wireless signal in this disclosure.

As a sub-embodiment, at least the first three of the transmitter/receiver 456, the MIMO transmitter 471, the transmitting processor 455, and the controller/processor 490 are used to transmit the first information in this disclosure.

As a sub-embodiment, the receiver 416, the MIMO detector 442, and the receiving processor 412 are used to receive the first information in this disclosure.

Embodiment 5

Figure 5:
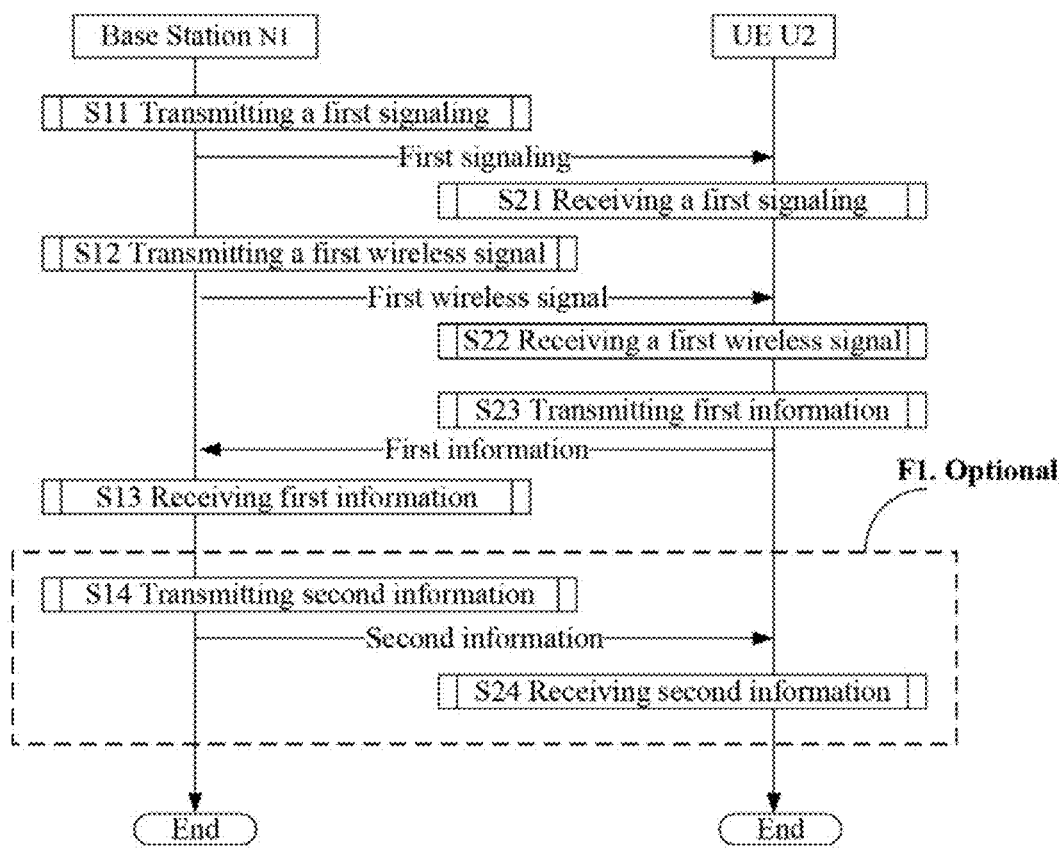
FIG. 5 shows a flow chart of wireless transmission in accordance with one embodiment of the present disclosure.

Embodiment 5 illustrates a flow chart of wireless transmission, as shown in FIG. 5. In FIG. 5, the base station N1 is a maintaining base station for the serving cell of the UE U2. In FIG. 5, the steps in block F1 are optional.

For N1, the first signaling is transmitted in step S11; the first wireless signal is transmitted in step S12; the first information is received in step S13; and the second signal is transmitted in step S14.

For U2, the first signaling is received in step S21; the first wireless signal is received in step S22; the first information is transmitted in step S23; and the second signal is received in step S24.

In Embodiment 5, K antenna port groups are used to transmit the first wireless signal. the first signaling is used to determine the K antenna port groups by U2. The K is a positive integer greater than 1. The K antenna port groups respectively correspond to K channel quality values. The K channel quality values are K non-negative real numbers. K1 antenna port groups of the K antenna port groups correspond to K1 channel quality values of the K channel quality values. the K1 is a positive integer less than or equal to the K. A first proportional sequence corresponds to a ratio(ratios) among the K1 channel quality values. The first information is used to determine the K1 antenna port groups and the first proportional sequence.

As a sub-embodiment, K2 antenna port groups in the K antenna port groups correspond to K2 channel quality values in the K channel quality values. The K2 is a positive integer less than or equal to the K. a second proportional sequence corresponds to a ratio among the K2 channel quality values. A first receiving beamforming vector is used to receive signals transmitted through the K1 antenna port groups by U@. A second receiving beamforming vector is used to receive signals transmitted through the K2 antenna port groups by U2. The first receiving beamforming vector and the second receiving beamforming vector are different; the first information is further used to determine the K2 antenna port groups and the second proportional sequence.

As a sub-embodiment, any two antenna port groups in the K1 antenna port groups, and any two antenna port groups in the K2 antenna port groups are co-located or quasi-co-located (QCL); or, any two antenna port groups in the K1 antenna port groups, and any two antenna port groups in the K2 antenna port groups are on the same carrier.

As a sub-embodiment, the first signaling is further used to determine at least the last one of the K1, the K2, or the target threshold by U2. The target threshold is a non-negative real number. The first channel quality is the best channel quality value of the K1 channel quality values. The second channel quality is the worst channel quality value of the K1 channel quality values. The third channel quality is the best channel quality value of the K2 channel quality values. The fourth channel quality is the worst channel quality value of the K2 channel quality values. At least one of a ratio between the second channel quality and the first channel quality, or a ratio between the fourth channel quality and the third channel quality is greater than or equal to the target threshold.

As a sub-embodiment, the first information is further used by U2 to determine at least one of the first channel quality or the third channel quality.

As a sub-embodiment, the target antenna port group is used by N1 to transmit the second wireless signal.

As a sub-embodiment, the target antenna port group is associated with the K1 antenna port groups and the first proportional sequence. The K1 antenna port groups correspond to K1 analog beamforming vectors. The K1 analog beam vectors and the first proportional sequence are used by N1 to generate a first target analog beamforming vector. The first target analog beamforming vector is used for analog beamforming of the target antenna port group. The first receive beamforming vector is used by U2 to receive the second wireless signal.

As a sub-embodiment, the target antenna port group is associated with the K2 antenna port groups and the second proportional sequence. The K2 antenna port groups correspond to K2 analog beamforming vectors. The K2 analog beam vectors and the second proportional sequence are used by N1 to generate a second target analog beamforming vector. The second target analog beamforming vector is used for analog beamforming of the target antenna port group. The second receive beamforming vector is used by U2 to receive the second wireless signal.

Embodiment 6

Figure 6:
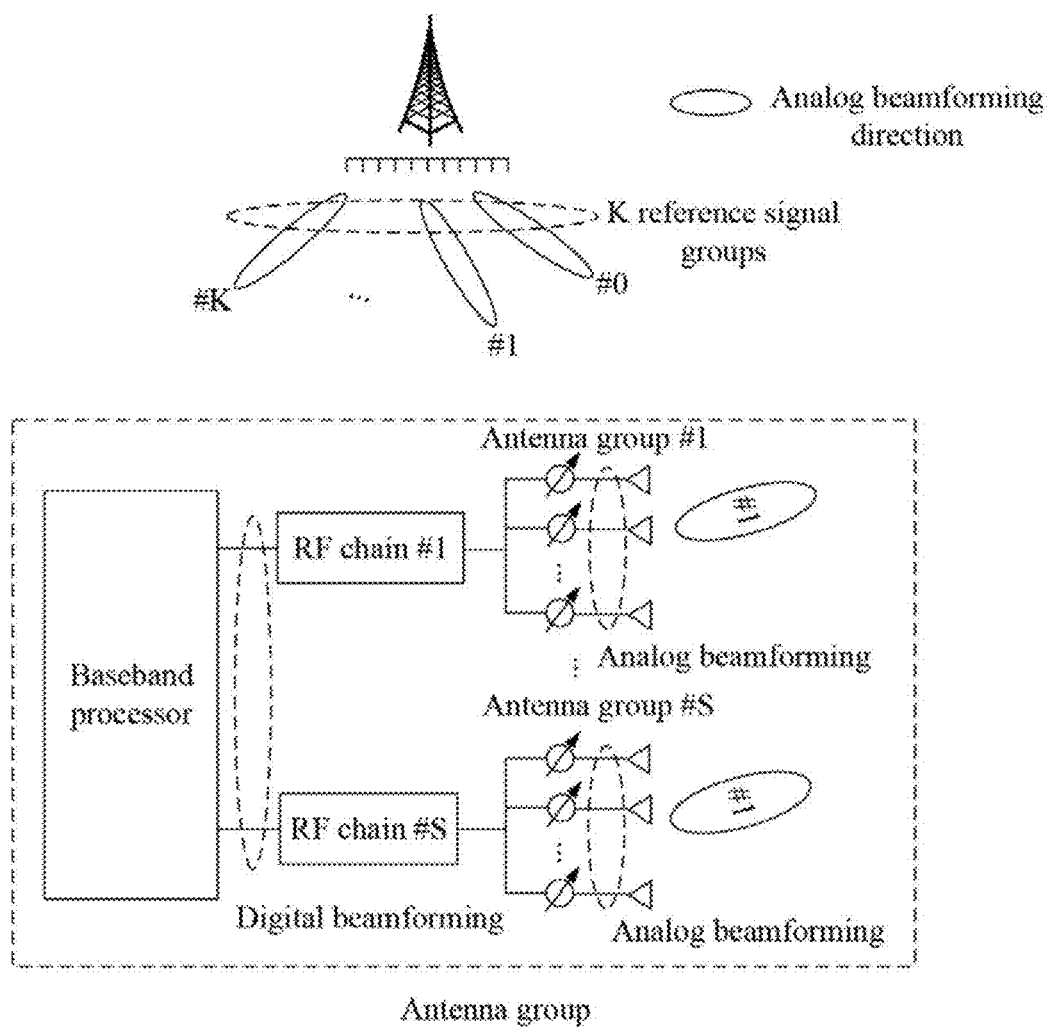
FIG. 6 shows a schematic diagram of analog beamforming of K reference signal groups in accordance with an embodiment of the present disclosure.

Embodiment 6 illustrates a schematic diagram of analog beamforming of K reference signal groups, as shown in FIG. 6.

In Embodiment 6, the K reference signal groups and the K antenna port groups are in one-to-one correspondence. The number of the reference signals in the reference signal group is equal to the number of the antenna ports in the corresponding antenna port group.

In Embodiment 6, a physical antenna corresponding to one antenna port is divided into S antenna groups, and each of the antenna groups includes a plurality of antennas. The S is a positive integer. The antenna port is formed by superposing multiple antennas in the S antenna groups through antenna virtualization. The mapping coefficients of the plurality of antennas in the S antenna groups to the antenna port constitute a beamforming vector. One antenna group is connected to the baseband processor via a radio frequency (RF) link. One beamforming vector is composed of an analog beamforming vector and a digital beamforming vector. The mapping coefficients of the plurality of antennas in the same antenna group to the antenna port constitute an analog beamforming vector of the antenna group. Different antenna groups included in one antenna port corresponding to the same analog beamforming vector. The mapping coefficients of the different RF links included in the antenna port to the antenna port constitute a digital beamforming vector of the antenna port.

As a sub-embodiment, the reference signal group includes only one reference signal, and the reference signal in the reference signal group is transmitted by an antenna port in a corresponding transmitting antenna port group.

As a sub-embodiment, the reference signal group includes only a plurality of the reference signals, and the plurality of reference signals in the reference signal group are respectively sent by multiple antenna ports in the corresponding transmitting antenna port group. Different antenna ports in one antenna port group correspond to one same analog beamforming vector.

As a sub-embodiment, different antenna ports in one antenna port group correspond to the different digital beamforming vectors.

As a sub-embodiment, the K antenna port groups are a subset of M antenna port groups. The UE transmits auxiliary information according to the measurement in the M antenna port groups. The base station determines, according to the auxiliary information, and configures the K antenna port groups for the UE.

Embodiment 7

Figure 7:
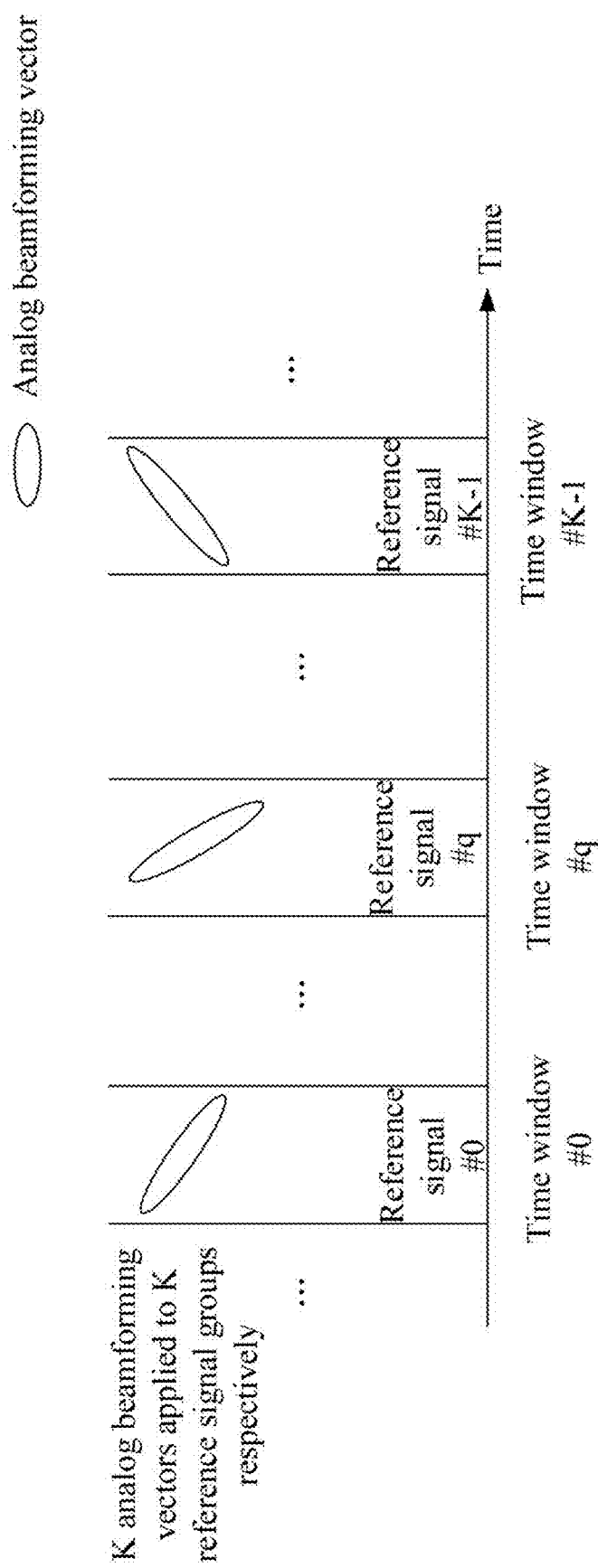
FIG. 7 shows a timing diagram of K reference signal groups in accordance with one embodiment of the present disclosure.

Embodiment 7 illustrates a timing diagram of K reference signal groups, as shown in FIG. 7.

In Embodiment 7, the K antenna port groups correspond to K reference signal groups. The time domain resources occupied by any two antenna port groups in the K reference signal groups are orthogonal. The analog beamforming vectors corresponding to any two reference signal groups in the K reference signal groups cannot be considered to be the same. The K reference signal groups occupy K time windows. The K time windows are orthogonal in the time domain.

As a sub-embodiment, FIG. 7 depicts one transmission of the K reference signal groups. The K reference signal groups are transmitted periodically.

As a sub-embodiment, the reference signal adopts a pattern of CSI-RS within a time window.

As a sub-embodiment, the reference signal adopts a pattern of SS within a time window.

As a sub-embodiment, the time window in FIG. 7 includes Q1 OFDM symbols, and the Q1 is one of 2, 4, 7 and 14.

Embodiment 8

Figure 8:
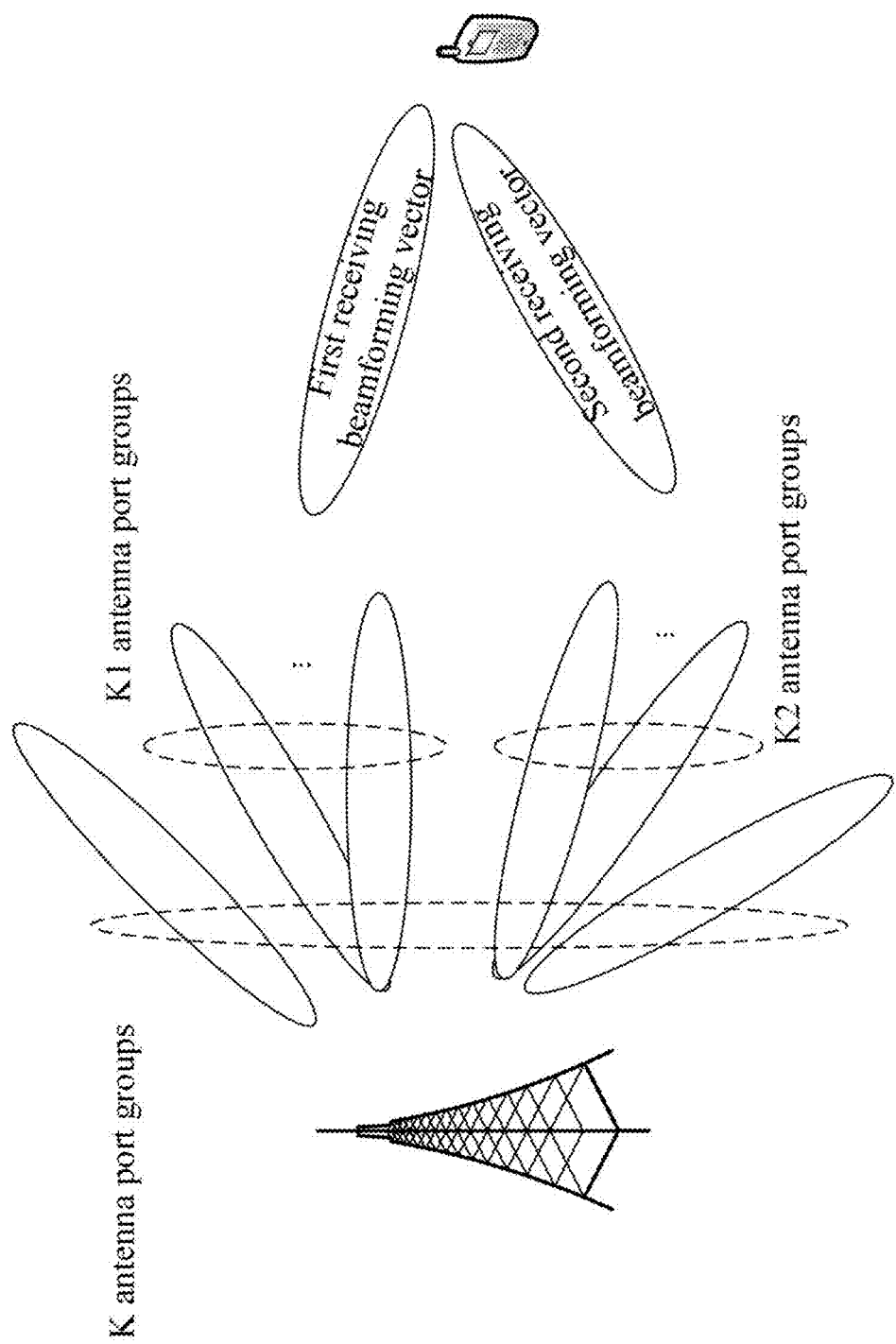
FIG. 8 shows a schematic diagram of K1 antenna port groups and K2 antenna port groups in accordance with one embodiment of the present disclosure.

Embodiment 8 illustrates a schematic diagram of K1 antenna port groups and K2 antenna port groups, as shown FIG. 8. In Embodiment 8, the K antenna port groups are used to transmit the first wireless signal. The K analog beamforming vectors are used for transmitting analog beamforming of the K antenna port groups respectively. The K antenna port groups respectively correspond to K channel quality values. The best K1+K2 channel quality values of the K channel quality values respectively correspond to the first receive beamforming vector and the second receive beamforming vector. The first receiving beamforming vector performs receiving analog beamforming on the signals transmitted through the K1 antenna port groups. The second receiving beamforming vector performs receiving analog beamforming on the signals transmitted through the K2 antenna port groups.

Embodiment 9

Figure 9:
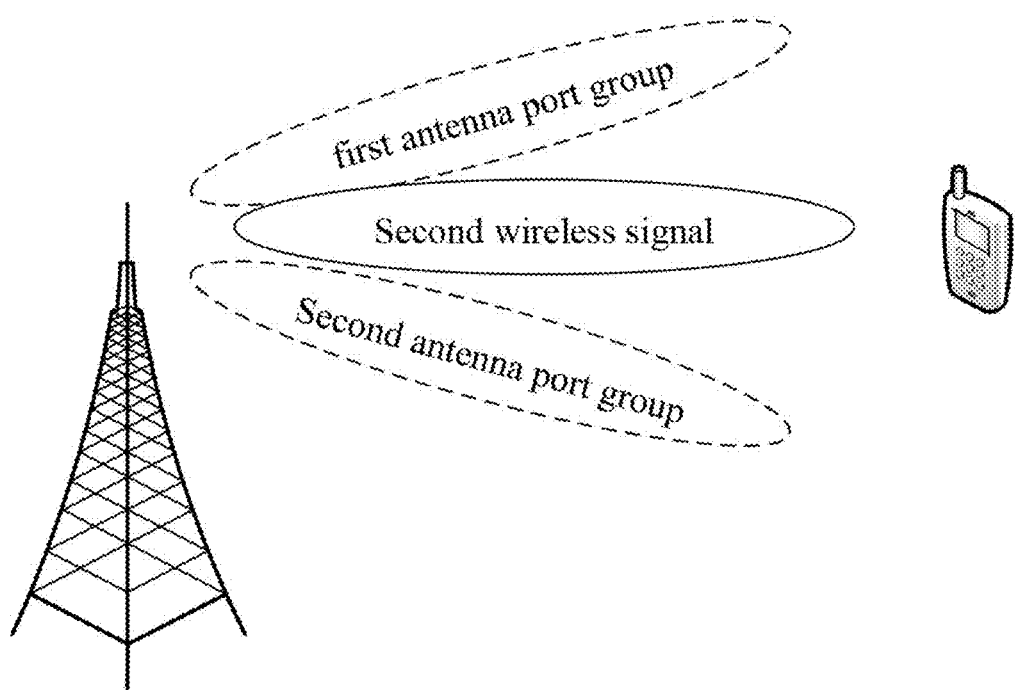
FIG. 9 shows a schematic diagram of a second wireless signal beamforming in accordance with an embodiment of the present disclosure.

Embodiment 9 illustrates a schematic diagram of a second wireless signal beamforming, as shown in FIG. 9. In FIG. 9, the dotted ellipse represents an analog beam for transmitting a first wireless signal, and the solid ellipse represents an analog beam for transmitting a second wireless signal.

In Embodiment 9, the UE receives the first wireless signal transmitted through the K antenna port groups. The K antenna port groups correspond to the K channel quality values. The UE receives the first signaling to determine that K1 is equal to 2. The first antenna port group and the second antenna port group are two antenna port groups of the K antenna port groups. The first antenna port group corresponds to the first channel quality. The second antenna port group is corresponding to the second channel quality. The first channel quality is a best channel quality value of the K channel quality values. The second channel quality is a second best channel quality value of the K channel quality values. The UE reports {the first antenna port group, the second antenna port group, and the first proportional sequence} to the base station. The first proportional sequence is composed of 1, ratio of the second channel quality and the first channel quality. The first analog beamforming vector is used for analog beamforming of the first antenna port group. The second analog beamforming vector is used for analog beamforming of the second antenna port group. The base station generates a target analog beamforming vector by using a direction corresponding to the first analog beamforming vector, a direction corresponding to the second analog beamforming vector, and the first proportional sequence according to the UE report. The beam direction corresponding to the target analog beamforming vector is between a beam direction corresponding to the first analog beamforming vector and a beam direction corresponding to the second analog beamforming vector. The target analog beamforming vector is used for analog beamforming of the target antenna port group. The target antenna port group is used to transmit the second wireless signal.

Embodiment 10

Figure 10:
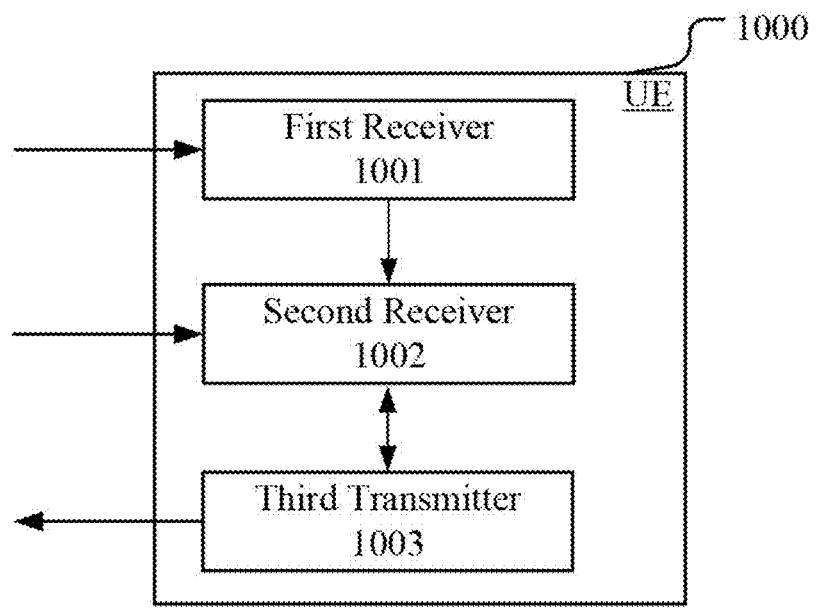
FIG. 10 shows a block diagram showing the structure of a processing device in a UE in accordance with an embodiment of the present disclosure.

Embodiment 10 illustrates a block diagram showing the structure of a processing device in a UE. In FIG. 10, a UE 1000 is composed of a first receiver 1001, a second receiver 1002, and a third transmitter 1003.

In Embodiment 10, the first receiver 1001 is configured to receive the first signaling; the second receiver 1002 is configured to receive the first wireless signal; and the third transmitter 1003 is configured to send the first information.

In Embodiment 10, K antenna port groups are used to transmit the first wireless signal; the first signaling is used to determine the K antenna port groups. The K is a positive integer greater than 1. The K antenna port groups respectively correspond to K channel quality values. The K channel quality values are K non-negative real numbers. K1 antenna port groups of the K antenna port groups correspond to K1 channel quality values of the K channel quality values. The K1 is a positive integer less than or equal to the K. A first proportional sequence corresponds to a ratio(ratios) among the K1 channel quality values. The first information is used to determine the K1 antenna port groups and the first proportional sequence.

As a sub-embodiment, the K2 antenna port groups in the K antenna port groups correspond to K2 channel quality values in the K channel quality values. The K2 is a positive integer less than or equal to the K. A second proportional sequence corresponds to a ratio among the K2 channel quality values. A first receiving beamforming vector is used to receive signals transmitted through the K1 antenna port groups. A second receiving beamforming vector is used to receive signals transmitted through the K2 antenna port groups. The first receiving beamforming vector and the second receiving beamforming vector are different; the first information is further used to determine the K2 antenna port groups and the second proportional sequence.

As a sub-embodiment, any two antenna port groups in the K1 antenna port groups, and any two antenna port groups in the K2 antenna port groups are co-located or quasi-co-located (QCL); or, any two antenna port groups in the K1 antenna port groups and any two antenna port groups in the K2 antenna port groups are on the same carrier.

As a sub-embodiment, the first signaling is further used to determine at least the last one of the K1, the K2, or the target threshold. The target threshold is a non-negative real number. The first channel quality is a best channel quality value of the K1 channel quality values. The second channel quality is the worst channel quality value of the K1 channel quality values. The third channel quality is a best channel quality value of the K2 channel quality values. The fourth channel quality is the worst channel quality value of the K2 channel quality values. At least one of a ratio between the second channel quality and the first channel quality or a ratio between the fourth channel quality and the third channel quality is greater than or equal to the target threshold.

As a sub-embodiment, the first information is further used to determine at least one of the first channel quality or the third channel quality.

As a sub-embodiment, the second receiver 1002 is also used to receive a second wireless signal. The target antenna port group is used to transmit the second wireless signal. The target antenna port group is associated with the K1 antenna port groups and the first proportional sequence; or, the target antenna port group is associated with the K2 antenna port groups and the second proportional sequence.

Embodiment 11

Figure 11:
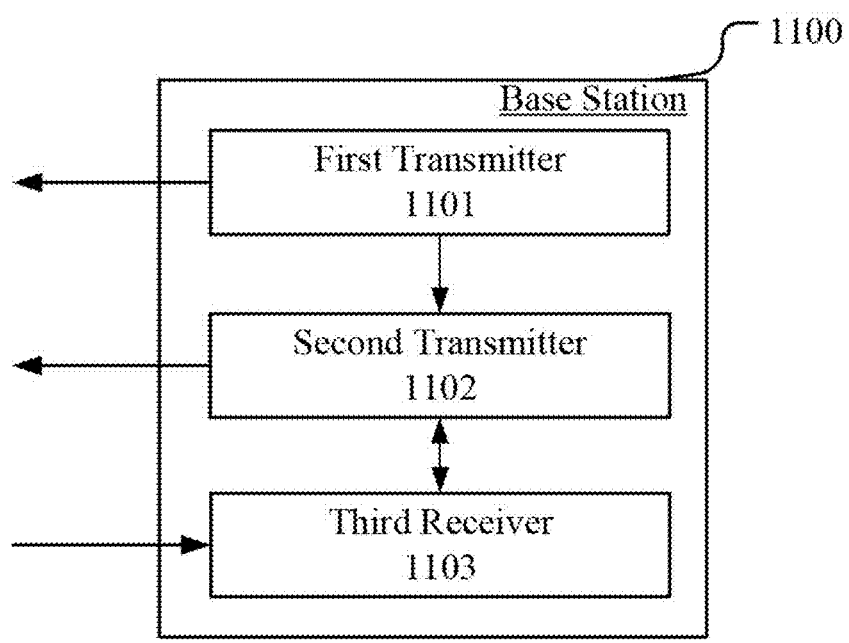
FIG. 11 shows a block diagram showing the structure of a processing device in a base station in accordance with an embodiment of the present disclosure.

Embodiment 11 illustrates a block diagram showing the structure of a processing device in a base station, as shown in FIG. 11.

In FIG. 11, the base station 1100 includes a first transmitter 1101, a second transmitter 1102, and a third receiver 1103.

In Embodiment 11, the first transmitter 1101 is configured to transmit the first signaling; the second transmitter 1102 is configured to transmit the first wireless signal; and the third receiver 1103 is configured to receive the first information.

In Embodiment 11, K antenna port groups are used to transmit the first wireless signal; the first signaling is used to determine the K antenna port groups. The K is a positive integer greater than 1. The K antenna port groups respectively correspond to K channel quality values. The K channel quality values are K non-negative real numbers. K1 antenna port groups of the K antenna port groups correspond to K1 channel quality values of the K channel quality values. The K1 is a positive integer less than or equal to the K. A first proportional sequence corresponds to a ratio(ratios) among the K1 channel quality values. The first information is used to determine the K1 antenna port groups and the first proportional sequence.

As a sub-embodiment, the K2 antenna port groups in the K antenna port groups correspond to K2 channel quality values in the K channel quality values. The K2 is a positive integer less than or equal to the K. A second proportional sequence corresponds to a ratio among the K2 channel quality values. A first receiving beamforming vector is used to receive signals transmitted through the K1 antenna port groups. A second receiving beamforming vector is used to receive signals transmitted through the K2 antenna port groups. The first receiving beamforming vector and the second receiving beamforming vector are different; the first information is further used to determine the K2 antenna port groups and the second proportional sequence.

As a sub-embodiment, any two antenna port groups in the K1 antenna port groups, and any two antenna port groups in the K2 antenna port groups are co-located or quasi-co-located (QCL); or, any two antenna port groups in the K1 antenna port groups, and any two antenna port groups in the K2 antenna port groups are on the same carrier.

As a sub-embodiment, the first signaling is further used to determine at least the last one of the K1, the K2, or the target threshold. The target threshold is a non-negative real number. The first channel quality is a best channel quality value of the K1 channel quality values. The second channel quality is the worst channel quality value of the K1 channel quality values. The third channel quality is a best channel quality value of the K2 channel quality values. The fourth channel quality is the worst channel quality value of the K2 channel quality values. At least one of a ratio between the second channel quality and the first channel quality or a ratio between the fourth channel quality and the third channel quality is greater than or equal to the target threshold.

As a sub-embodiment, the first information is further used to determine at least one of the first channel quality or the third channel quality.

As a sub-embodiment, the second transmitter is further configured to transmit a second wireless signal. The target antenna port group is used to transmit the second wireless signal. The target antenna port group is associated with the K1 antenna port group and the first proportional sequence; or the target antenna port group is associated with the K2 antenna port group and the second proportional sequence.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, radio sensor, network cards, terminals for Internet of Things (TOT), RFID terminals, NB-IOT terminals, Machine Type Communication (MTC) terminals, enhanced MTC (eMTC) terminals, data cards, low-cost mobile phones, low-cost tablet computers, etc. The base station in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method for multi-antenna transmission in a user equipment (UE), comprising:
   receiving a first signaling;
   receiving a first wireless signal; and
   transmitting first information;
   wherein, K antenna port groups are used to transmit the first wireless signal; the first signaling is used to determine the K antenna port groups transmitting the first wireless signal; the K is a positive integer greater than 1; the K antenna port groups respectively correspond to K channel quality values; the K channel quality values are K non-negative real numbers; the K channel quality values are Reference Signal Received Powers (RSRPs) or Signal to Interference plus Noise Ratios (SINRs); K1 antenna port groups of the K antenna port groups correspond to K1 channel quality values of the K channel quality values; the K1 is a positive integer less than or equal to the K; a first proportional sequence corresponds to a ratio(ratios) among the K1 channel quality values; the first information is used to determine the K1 antenna port groups and the first proportional sequence; the first signaling is used to determine a target threshold; the target threshold is a non-negative real number; a first channel quality is a best channel quality value among the K1 channel quality values; a second channel quality is a worse channel quality value among the K1 channel quality values; a ratio between the second channel quality and the first channel quality is greater than or equal to the target threshold; the first signaling is a RRC (Radio Resource Control) signaling; the first information is transmitted in a CSI (Channel State Information) report; the first information is carried by a PUSCH (Physical Uplink Shared Channel) or a PUCCH (Physical Uplink Control Channel).

2. The method according to claim 1, wherein the K channel quality values are broadband channel quality values; or the first proportional sequence comprises K1 positive real numbers less than or equal to 1, and the first proportional sequence comprises at least one 1; or the first proportional sequence comprises quantized values corresponding to K1 positive real numbers; or the first proportional sequence is composed of K1 positive real numbers, and the K1 positive real numbers are respectively ratios between the K1 channel quality values and the best channel quality value of the K1 channel quality values; or the first proportional sequence comprises K1-1 positive real number(s), and the K1-1 positive real number(s) is(are) a ratio(ratios) between a channel quality value(s) other than the best channel quality value among the K1 channel quality values and the best channel quality value; or the first proportional sequence comprises quantized values corresponding to K1-1 positive real number(s).

3. The method according to claim 1, wherein the first signaling is UE specific;
   or, the unit of the target threshold is dB;
   or, the first signaling implicitly indicates the target threshold;
   or, the K antenna port groups correspond to K reference signal groups, the time domain resources occupied by any two of the K reference signal groups are orthogonal, the analog beamforming vectors corresponding to any two of the K reference signal groups cannot be considered to be the same, the K reference signal groups occupy K time windows, and the K time windows are orthogonal in the time domain.

4. The method according to claim 1, wherein any two antenna ports in the K1 antenna port groups are co-located or quasi-co-located (QCL); or any two antenna ports in the K1 antenna port groups are on a same carrier; or the first signaling is further used to determine the K1, and the first information is further used to determine the first channel quality.

5. The method according to claim 1, wherein the K antenna port groups respectively correspond to K reference signal groups; the K reference signal groups are respectively transmitted through the K antenna port groups; the first wireless signal is composed of the K reference signal groups; the antenna port group is composed of one antenna port, or, the antenna port group is composed of a plurality of antenna ports; the antenna port corresponds to a reference signal; the reference signal is transmitted through the antenna port; the reference signal is a SS (Synchronization Signal) or a CSI-RS (Channel State Information Reference Signal) or a DMRS of a PBCH (Physical Broadcast Channel).

6. A method for multi-antenna transmission in a base station, comprising:
   transmitting a first signaling;
   transmitting a first wireless signal; and
   receiving first information;
   wherein, K antenna port groups are used to transmit the first wireless signal; the first signaling is used to determine the K antenna port groups transmitting the first wireless signal; the K is a positive integer greater than 1; the K antenna port groups respectively correspond to K channel quality values; the K channel quality values are K non-negative real numbers; the K channel quality values are Reference Signal Received Powers (RSRPs) or Signal to Interference plus Noise Ratios (SINRs); K1 antenna port groups of the K antenna port groups correspond to K1 channel quality values of the K channel quality values; the K1 is a positive integer less than or equal to the K; a first proportional sequence corresponds to a ratio(ratios) among the K1 channel quality values; the first information is used to determine the K1 antenna port groups and the first proportional sequence; the first signaling is used to determine a target threshold; the target threshold is a non-negative real number; a first channel quality is a best channel quality value among the K1 channel quality values; a second channel quality is a worse channel quality value among the K1 channel quality values; a ratio between the second channel quality and the first channel quality is greater than or equal to the target threshold; the first signaling is a RRC (Radio Resource Control) signaling; the first information is transmitted in a CSI (Channel State Information) report; the first information is carried by a PUSCH (Physical Uplink Shared Channel) or a PUCCH (Physical Uplink Control Channel).

7. The method according to claim 6, wherein the K channel quality values are broadband channel quality values; or the first proportional sequence comprises K1 positive real numbers less than or equal to 1, and the first proportional sequence comprises at least one 1; or the first proportional sequence comprises quantized values corresponding to K1 positive real numbers; or the first proportional sequence is composed of K1 positive real numbers, and the K1 positive real numbers are respectively ratios between the K1 channel quality values and the best channel quality value of the K1 channel quality values; or the first proportional sequence comprises K1-1 positive real number(s), and the K1-1 positive real number(s) is(are) a ratio(ratios) between a channel quality value(s) other than the best channel quality value among the K1 channel quality values and the best channel quality value; or the first proportional sequence comprises quantized values corresponding to K1-1 positive real number(s).

8. The method according to claim 6, wherein the first signaling is UE specific;
   or, the unit of the target threshold is dB;
   or, the first signaling implicitly indicates the target threshold;
   or, the K antenna port groups correspond to K reference signal groups, the time domain resources occupied by any two of the K reference signal groups are orthogonal, the analog beamforming vectors corresponding to any two of the K reference signal groups cannot be considered to be the same, the K reference signal groups occupy K time windows, and the K time windows are orthogonal in the time domain.

9. The method according to claim 8, wherein any two antenna ports in the K1 antenna port groups are co-located or quasi-co-located (QCL); or any two antenna ports in the K1 antenna port groups are on a same carrier; or the first signaling is further used to determine the K1, and the first information is further used to determine the first channel quality.

10. The method according to claim 6, wherein the K antenna port groups respectively correspond to K reference signal groups; the K reference signal groups are respectively transmitted through the K antenna port groups; the first wireless signal is composed of the K reference signal groups; the antenna port group is composed of one antenna port, or, the antenna port group is composed of a plurality of antenna ports; the antenna port corresponds to a reference signal; the reference signal is transmitted through the antenna port; the reference signal is a SS (Synchronization Signal) or a CSI-RS (Channel State Information Reference Signal) or a DMRS of a PBCH (Physical Broadcast Channel).

11. A user equipment (UE) for multi-antenna transmission comprising:
   a first receiver, receiving a first signaling;
   a second receiver, receiving a first wireless signal; and
   a third transmitter, transmitting first information;
   wherein, K antenna port groups are used to transmit the first wireless signal; the first signaling is used to determine the K antenna port groups transmitting the first wireless signal; the K is a positive integer greater than 1; the K antenna port groups respectively correspond to K channel quality values; the K channel quality values are K non-negative real numbers; the K channel quality values are Reference Signal Received Powers (RSRPs) or Signal to Interference plus Noise Ratios (SINRs); K1 antenna port groups of the K antenna port groups correspond to K1 channel quality values of the K channel quality values; the K1 is a positive integer less than or equal to the K; a first proportional sequence corresponds to a ratio(ratios) among the K1 channel quality values; the first information is used to determine the K1 antenna port groups and the first proportional sequence; the first signaling is used to determine a target threshold; the target threshold is a non-negative real number; a first channel quality is a best channel quality value among the K1 channel quality values; a second channel quality is a worse channel quality value among the K1 channel quality values; a ratio between the second channel quality and the first channel quality is greater than or equal to the target threshold; the first signaling is a RRC (Radio Resource Control) signaling; the first information is transmitted in a CSI (Channel State Information) report; the first information is carried by a PUSCH (Physical Uplink Shared Channel) or a PUCCH (Physical Uplink Control Channel).

12. The user equipment to claim 11, wherein the K channel quality values are broadband channel quality values; or the first proportional sequence comprises K1 positive real numbers less than or equal to 1, and the first proportional sequence comprises at least one 1; or the first proportional sequence comprises quantized values corresponding to K1 positive real numbers; or the first proportional sequence is composed of K1 positive real numbers, and the K1 positive real numbers are respectively ratios between the K1 channel quality values and the best channel quality value of the K1 channel quality values; or the first proportional sequence comprises K1-1 positive real number(s), and the K1-1 positive real number(s) is(are) a ratio(ratios) between a channel quality value(s) other than the best channel quality value among the K1 channel quality values and the best channel quality value; or the first proportional sequence comprises quantized values corresponding to K1-1 positive real number(s).

13. The user equipment to claim 11, wherein the first signaling is UE specific;
   or, the unit of the target threshold is dB;
   or, the first signaling implicitly indicates the target threshold;
   or, the K antenna port groups correspond to K reference signal groups, the time domain resources occupied by any two of the K reference signal groups are orthogonal, the analog beamforming vectors corresponding to any two of the K reference signal groups cannot be considered to be the same, the K reference signal groups occupy K time windows, and the K time windows are orthogonal in the time domain.

14. The user equipment to claim 13, wherein any two antenna ports in the K1 antenna port groups are co-located or quasi-co-located (QCL); or any two antenna ports in the K1 antenna port groups are on a same carrier; or the first signaling is further used to determine the K1, and the first information is further used to determine the first channel quality.

15. The user equipment to claim 11, wherein the K antenna port groups respectively correspond to K reference signal groups; the K reference signal groups are respectively transmitted through the K antenna port groups; the first wireless signal is composed of the K reference signal groups; the antenna port group is composed of one antenna port, or, the antenna port group is composed of a plurality of antenna ports; the antenna port corresponds to a reference signal; the reference signal is transmitted through the antenna port; the reference signal is a SS (Synchronization Signal) or a CSI-RS (Channel State Information Reference Signal) or a DMRS of a PBCH (Physical Broadcast Channel).

16. A base station for multi-antenna transmission comprising:
  a first transmitter, transmitting a first signaling;
  a second transmitter, transmitting a first radio signal; and
  a third receiver, receiving first information;
  wherein, K antenna port groups are used to transmit the first wireless signal; the first signaling is used to determine the K antenna port groups transmitting the first wireless signal; the K is a positive integer greater than 1; the K antenna port groups respectively correspond to K channel quality values; the K channel quality values are K non-negative real numbers; the K channel quality values are Reference Signal Received Powers (RSRPs) or Signal to Interference plus Noise Ratios (SINRs); K1 antenna port groups of the K antenna port groups correspond to K1 channel quality values of the K channel quality values; the K1 is a positive integer less than or equal to the K; a first proportional sequence corresponds to a ratio(ratios) among the K1 channel quality values; the first information is used to determine the K1 antenna port groups and the first proportional sequence; the first signaling is used to determine a target threshold; the target threshold is a non-negative real number; a first channel quality is a best channel quality value among the K1 channel quality values; a second channel quality is a worse channel quality value among the K1 channel quality values; a ratio between the second channel quality and the first channel quality is greater than or equal to the target threshold; the first signaling is a RRC (Radio Resource Control) signaling; the first information is transmitted in a CSI (Channel State Information) report; the first information is carried by a PUSCH (Physical Uplink Shared Channel) or a PUCCH (Physical Uplink Control Channel).

17. The base station to claim 16, wherein the K channel quality values are broadband channel quality values; or the first proportional sequence comprises K1 positive real numbers less than or equal to 1, and the first proportional sequence comprises at least one 1; or the first proportional sequence comprises quantized values corresponding to K1 positive real numbers; or the first proportional sequence is composed of K1 positive real numbers, and the K1 positive real numbers are respectively ratios between the K1 channel quality values and the best channel quality value of the K1 channel quality values; or the first proportional sequence comprises K1-1 positive real number(s), and the K1-1 positive real number(s) is(are) a ratio(ratios) between a channel quality value(s) other than the best channel quality value among the K1 channel quality values and the best channel quality value; or the first proportional sequence comprises quantized values corresponding to K1-1 positive real number(s).

18. The base station to claim 16, wherein the first signaling is UE specific;
  or, the unit of the target threshold is dB;
  or, the first signaling implicitly indicates the target threshold;
  or, the K antenna port groups correspond to K reference signal groups, the time domain resources occupied by any two of the K reference signal groups are orthogonal, the analog beamforming vectors corresponding to any two of the K reference signal groups cannot be considered to be the same, the K reference signal groups occupy K time windows, and the K time windows are orthogonal in the time domain.

19. The base station to claim 18, wherein any two antenna ports in the K1 antenna port groups are co-located or quasi-co-located (QCL); or any two antenna ports in the K1 antenna port groups are on a same carrier; or the first signaling is further used to determine the K1, and the first information is further used to determine the first channel quality.

20. The base station to claim 16, wherein the K antenna port groups respectively correspond to K reference signal groups; the K reference signal groups are respectively transmitted through the K antenna port groups; the first wireless signal is composed of the K reference signal groups; the antenna port group is composed of one antenna port, or, the antenna port group is composed of a plurality of antenna ports; the antenna port corresponds to a reference signal; the reference signal is transmitted through the antenna port; the reference signal is a SS (Synchronization Signal) or a CSI-RS (Channel State Information Reference Signal) or a DMRS of a PBCH (Physical Broadcast Channel).

* * * * *